(12) United States Patent
Duthoit et al.

(10) Patent No.: US 12,101,317 B2
(45) Date of Patent: Sep. 24, 2024

(54) COMPUTER-IMPLEMENTED USER IDENTITY VERIFICATION METHOD

(71) Applicants: Marc Duthoit, Pembroke Pines, FL (US); Eric Eva-Candela, Saint-Mandrier-sur-Mer (FR)

(72) Inventors: Marc Duthoit, Pembroke Pines, FL (US); Eric Eva-Candela, Saint-Mandrier-sur-Mer (FR)

( * ) Notice: Subject to any disclaimer, the term of this patent is extended or adjusted under 35 U.S.C. 154(b) by 218 days.

(21) Appl. No.: 17/889,881

(22) Filed: Aug. 17, 2022

(65) Prior Publication Data

US 2023/0050280 A1 Feb. 16, 2023

Related U.S. Application Data

(63) Continuation of application No. PCT/US2021/031316, filed on May 7, 2021.

(51) Int. Cl.
*H04L 9/40* (2022.01)
*G06Q 20/38* (2012.01)
*G06Q 20/40* (2012.01)

(52) U.S. Cl.
CPC ........ *H04L 63/0861* (2013.01); *H04L 63/062* (2013.01); *H04L 63/0876* (2013.01)

(58) Field of Classification Search
CPC ............... H04L 63/0861; H04L 63/062; H04L 63/0876
USPC .......................................................... 713/182
See application file for complete search history.

(56) References Cited

U.S. PATENT DOCUMENTS

| | | | |
|---|---|---|---|
| 6,104,922 A | 8/2000 | Baumann | |
| 6,879,966 B1 | 4/2005 | Lapsley et al. | |
| 6,934,861 B2 | 8/2005 | Haala | |
| 7,269,737 B2 | 9/2007 | Robinson | |
| 7,360,689 B2 | 4/2008 | Beenau et al. | |
| 7,565,329 B2 | 7/2009 | Lapsley et al. | |
| 7,882,032 B1 | 2/2011 | Hoffman | |
| 9,141,951 B2 | 9/2015 | McNeal | |
| 10,412,080 B1* | 9/2019 | Edwards | ............. H04L 63/0807 |

(Continued)

OTHER PUBLICATIONS

Ashok Kumar Das; Biometrics-Based Privacy-Preserving User Authentication Scheme for Cloud-Based Industrial Internet of Things Deployment; IEEE, Year:2018; pp. 4900-4913.*

*Primary Examiner* — Monjur Rahim
(74) *Attorney, Agent, or Firm* — Mark C. Johnson; Johnson | Dalal

(57) ABSTRACT

A computer-implemented method of verifying a user's identity comprising the steps of receiving biometric user data, personalized user data, and unique phone data of a verifying user from the verifying user's electronic computing device 102, compiling the biometric user data, personalized user data, and unique phone data of a verifying user into a single user identity data file, encrypting the single user identity data file and generating a data decryption key, and segregating the single user identity data file into a plurality of encrypted segregated user identity data files each independently stored on a first administrator server and a second administrator server, wherein the plurality of encrypted segregated user identity data files may only be aggregated and decrypted upon providing secondary biometric user data, personalized user data, and unique phone data which matches the original biometric user data, personalized user data, and unique phone data of the verifying user.

14 Claims, 17 Drawing Sheets

(56) References Cited

U.S. PATENT DOCUMENTS

| | | | |
|---|---|---|---|
| 10,878,428 B1* | 12/2020 | Comeaux | G06Q 30/0185 |
| 2004/0199469 A1 | 10/2004 | Barillova et al. | |
| 2005/0240779 A1* | 10/2005 | Aull | G06F 21/34 |
| | | | 713/186 |
| 2006/0064380 A1 | 3/2006 | Zukerman | |
| 2007/0061590 A1* | 3/2007 | Boye | G06F 21/305 |
| | | | 713/186 |
| 2007/0174633 A1* | 7/2007 | Draper | G06V 40/1353 |
| | | | 713/181 |
| 2008/0250245 A1* | 10/2008 | Sanderson | H04L 9/3231 |
| | | | 713/169 |
| 2012/0257797 A1* | 10/2012 | Leyvand | A63F 13/40 |
| | | | 382/118 |
| 2013/0297219 A1* | 11/2013 | Bangera | G16H 50/30 |
| | | | 702/19 |
| 2014/0278629 A1* | 9/2014 | Stephenson | H04L 67/535 |
| | | | 705/7.13 |
| 2016/0219046 A1 | 7/2016 | Ballard et al. | |
| 2016/0337326 A1 | 11/2016 | O'Hare et al. | |
| 2017/0032231 A1* | 2/2017 | Chapman | G06K 19/07327 |
| 2017/0300678 A1* | 10/2017 | Metke | H04W 12/068 |
| 2017/0317834 A1* | 11/2017 | Smith | H04L 63/0435 |
| 2018/0253725 A1* | 9/2018 | Smith | G06Q 20/065 |
| 2018/0343120 A1* | 11/2018 | Andrade | H04L 9/0866 |
| 2018/0367310 A1* | 12/2018 | Leong | H04L 63/102 |
| 2019/0130172 A1* | 5/2019 | Zhong | G06V 40/70 |
| 2019/0139051 A1 | 5/2019 | Kopf | |
| 2019/0182042 A1* | 6/2019 | Ebrahimi | H04L 9/3234 |
| 2019/0213311 A1* | 7/2019 | Tussy | G06V 10/17 |
| 2019/0311148 A1 | 10/2019 | Andrade | |
| 2019/0361694 A1 | 11/2019 | Gordon et al. | |
| 2020/0050794 A1 | 2/2020 | Hassan et al. | |
| 2020/0184278 A1* | 6/2020 | Zadeh | G06N 3/044 |
| 2020/0279270 A1* | 9/2020 | Lieberman | G06Q 20/3825 |
| 2021/0288981 A1* | 9/2021 | Numainville | H04L 63/1416 |
| 2021/0307621 A1* | 10/2021 | Svenson | A61B 5/7267 |
| 2022/0121884 A1* | 4/2022 | Zadeh | G06N 3/043 |
| 2023/0063632 A1* | 3/2023 | Robinson-Morgan | G06F 11/1469 |
| 2023/0097219 A1* | 3/2023 | Tormasov | G06F 21/32 |
| | | | 726/18 |
| 2023/0139161 A1* | 5/2023 | Tormasov | G06N 20/28 |
| | | | 726/28 |
| 2023/0206719 A1* | 6/2023 | Birkenmeyer | G07F 17/3211 |
| | | | 463/13 |

\* cited by examiner

To FIG. 5b

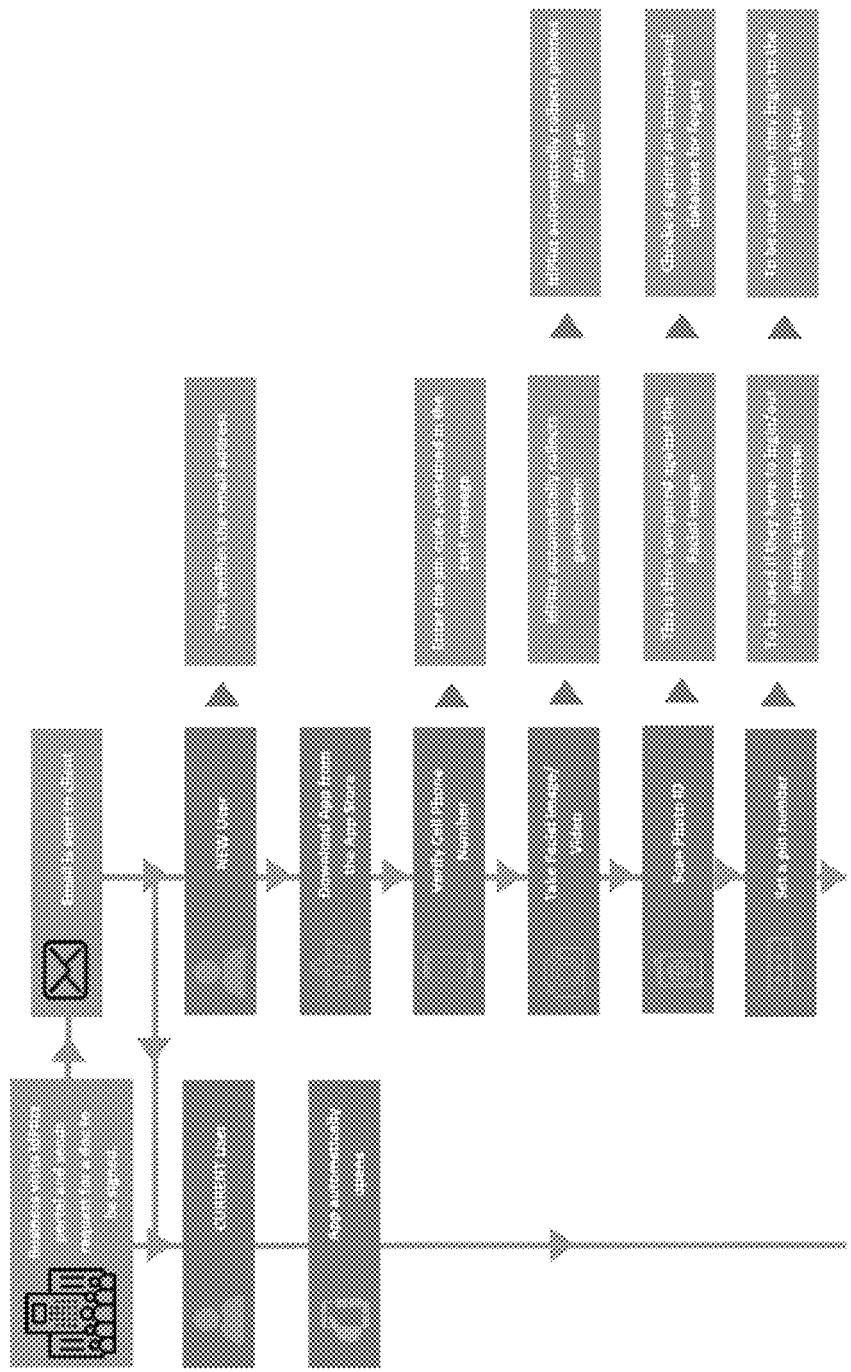

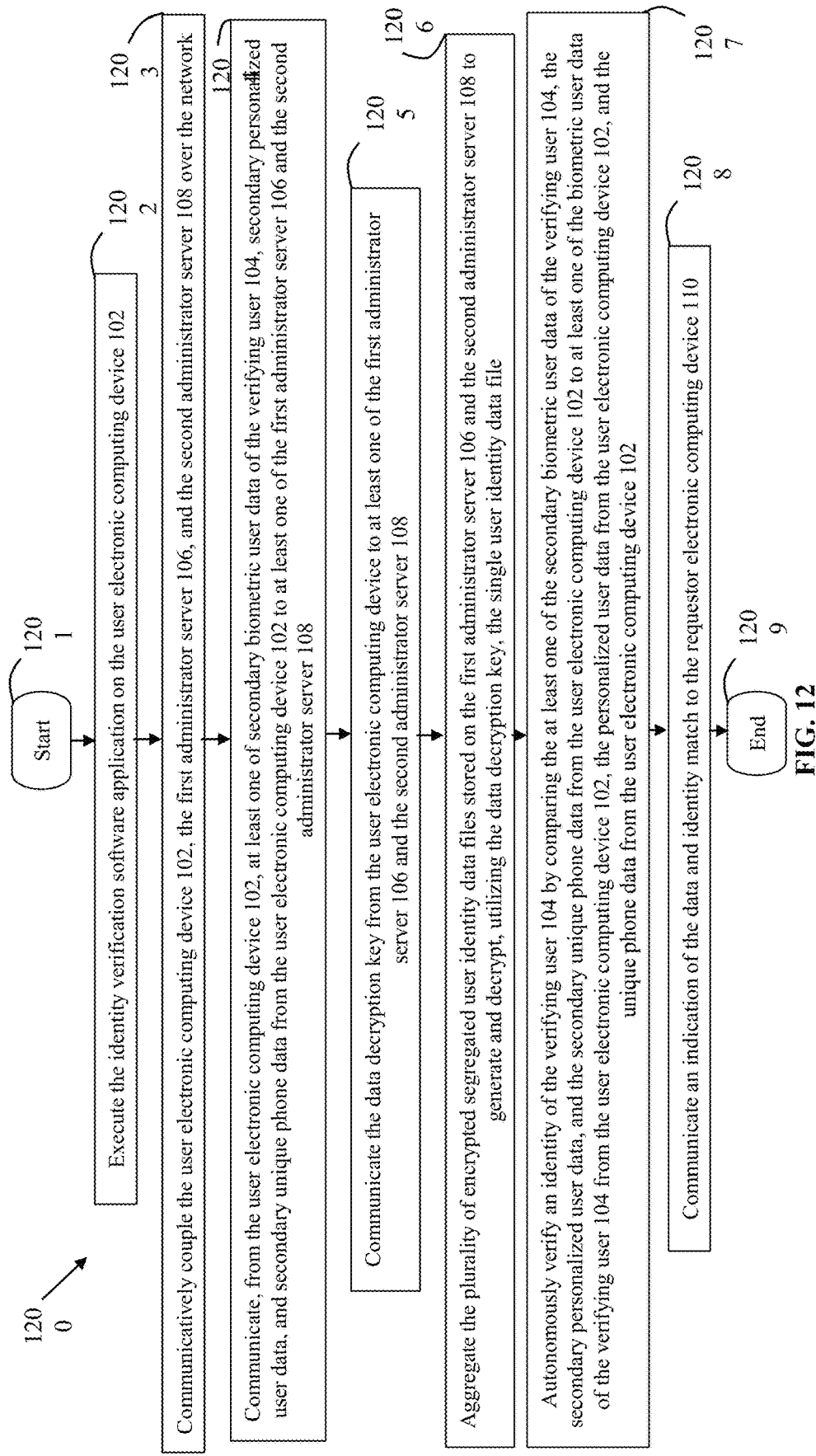

US 12,101,317 B2

COMPUTER-IMPLEMENTED USER IDENTITY VERIFICATION METHOD

FIELD OF THE INVENTION

The present invention relates generally to methods of identity verification and protection, and, more particularly, relates to a computer implemented user identity verification method.

BACKGROUND OF INVENTION

In order to verify the identity of a client or user online or when physically present, companies are currently forced to use multiple poor quality and often dated systems in an attempt to securely identify an individual. Companies requiring that documents or agreements be signed online have many existing options but none that allow companies to verify the identity of the individual signing the document in real time. Existing prior art currently relies on the security of the respondent's email address alone, along with dated online Portable Document Format ("PDF") signing services or a simple "tick box" to record agreement. Therefore, although they may receive an electronically signed document, the company has no real and concrete proof that it was the customer themselves who signed and agreed to it. Additional limitations of existing methods of electronic document signatures include the inability to prevent signed documents from being altered in the future. Due to the limitations with the prior art as stated above, some companies may then additionally request that documents be notarized by a third party. This further prolongs the process and constitutes an added inconvenience to the party signing the document.

For many companies, it is important that they know the true identity of a user before they allow them to take part in an online action. An online action may include entering a secure web portal, taking an examination, voting, opening an account or, indeed, any action where data privacy and security is vital. Again, companies are forced to use a selection of outdated systems and methods. For instance, some sites request a credit card number to check age and address, but many consumers are understandably hesitant or unwilling to provide this. Many financial institutions, including online stocks and bitcoin trading platforms, request that a recent photo ID be scanned and emailed to them before opening a new user account. This adds considerable time to the whole process but still offers no guarantees that the ID has not been copied or stolen. Video-conferencing technologies may also be used, whereby the company records a video conference. However, this is very time consuming especially if the user does not have ready access to video-conferencing capabilities and is unreliable to the extent it relies on staff to check against photo ID and is, therefore, exposed to the possibility of human error. Although most business to business and business to consumer transactions now take place online, there is no reliable way to ensure that identity fraud is not being perpetrated. With the computer implemented user identity verification method claimed herein, however, a company can be assured 100% that they are dealing with the correct and intended individual. Also, the present invention is designed to be able to track the identity of a timed online event, such as a student taking an online examination. Specifically, the present invention syncs the geolocation of the phone to the physical IP address of the computer and sends randomly timed requests for the user to identify themselves throughout the exam.

For clients physically visiting a company or organization, there are very few, if any, modern and robust identification solutions available to securely verify a user's identity. In accordance with existing prior art, a company generally has to maintain staff members that are sufficiently trained to look at the photo ID that is provided and compare it to the individual that appears before them, as well as to potentially charge a nominal amount to a credit card company to ensure they are the true owner of the card. One of the principal limitations with this method is that it still does not guarantee the individual's identity, merely that the individual knows the user's personal identification number.

Existing prior art is time consuming for both the company and the user, and fraught with danger if not completed by competent and well-trained staff. The present invention saves time whilst offering a much more robust and secure verification process because the claimed method may be used across different areas of a user's life as well as to meet various identification and verification needs.

Therefore, a need exists to overcome the problems with the prior art as discussed above.

SUMMARY OF THE INVENTION

The invention provides a computer-implemented user identity verification method that overcomes the hereinafore-mentioned disadvantages of the heretofore-known devices and methods of this general type and that provides a fast, secure, and fully automated method of verifying a user's identity to facilitate the completion of various tasks and activities including, without limitation, signing and/or notarizing documents, logging in to a website, shopping online, taking an exam, voting, etc.

With the foregoing and other objects in view, there is provided, in accordance with the invention, a computer-implemented user identity verification method comprising providing a user electronic computing device of a verifying user with an electronic display, a memory, a camera, and an executable identity verification software application resident the memory thereon; providing a requestor electronic computing device of a requesting user; providing a first administrator server and a second administrator server; receiving, at the first administrator server that is communicatively coupled to the user electronic computing device over a network, biometric user data of the verifying user from the user electronic computing device, personalized user data from the user electronic computing device, and unique phone data from the user electronic computing device; compiling the biometric user data, the personalized user data, and the unique phone data into a single user identity data file, encrypting the single user identity data file and generating a data decryption key, and segregating the single user identity data file into a plurality of encrypted segregated user identity data files each independently stored on the first administrator server and the second administrator server; communicating the data decryption key to the user electronic computing device for storage on the memory thereon; communicating an electronic identity verification request to the user electronic computing device, the electronic identity verification request forming a closed-network identity verification session that includes executing the identity verification software application on the user electronic computing device, communicatively coupling the user electronic computing device, the first administrator server, and the second administrator server over the network, communicating, from the user electronic computing device, at least one of secondary biometric user data of the verifying user, secondary personalized user data, and secondary unique phone data from the user electronic computing device to at least one of the first administrator server and the second administrator server, communicating the data decryption key from the user electronic computing device to at least one of the first administrator server and the second administrator server, aggregating the plurality of encrypted segregated user identity data files stored on the first administrator server and the second administrator server to generate and decrypt, utilizing the data decryption key, the single user identity data file, autonomously verifying an identity of the verifying user by comparing the at least one of the secondary biometric user data of the verifying user, the secondary personalized user data, and the secondary unique phone data from the user electronic computing device to at least one of the biometric user data of the verifying user from the user electronic computing device, the personalized user data from the user electronic computing device, and the unique phone data from the user electronic computing device to ascertain a data and identity match; and communicating an indication of the data and identity match to the requestor electronic computing device.

In accordance with a further feature of the present invention, the biometric user data of the verifying user received from the user electronic computing device includes a digital facial image depicting the verifying user taken by the camera of the user electronic computing device, the closed-network identity verification session further comprises: taking a picture of the verifying user from the camera of the user electronic computing device, the picture of the verifying user from the camera of the user electronic computer device forming part of the secondary biometric user data of the verifying user and communicating the at least one of a secondary biometric user data of the verifying user to the at least one of the first administrator server and the second administrator server; and autonomously verifying an identity of the verifying user by comparing the picture of the verifying user from the camera of the user electronic computer device forming part of the secondary biometric user data of the verifying user to the digital facial image depicting the verifying user taken by the camera of the user electronic computing device to ascertain the data and identity match.

In accordance with a further feature of the present invention, the computer-implemented user identity verification method further comprises communicating the electronic identity verification request to the user electronic computing device using a SMS text.

In accordance with another feature, an embodiment of the present invention includes storing the at least one of the secondary biometric user data of the verifying user, the secondary personalized user data, the secondary unique phone data from the user electronic computing device, the at least one of the biometric user data of the verifying user from the user electronic computing device, the personalized user data from the user electronic computing device, and the unique phone data from the user electronic computing device used in the closed-network identity verification session on at least one of the first administrator server and the second administrator server on a data block forming part of an interconnected plurality of data blocks linked together and each also having a cryptographic hash of a previously generated block and a timestamp.

In accordance with a further feature of the present invention, the user electronic computing device and the requestor electronic computing device are located in geographically remote and independent locations with respect to the first administrator server and the second administrator server.

In accordance with yet another feature of the present invention, the computer-implemented user identity verification method further comprises segregating the single user identity data file into the plurality of encrypted segregated user identity data files each of randomly generated data sizes.

In accordance with another feature, an embodiment of the present invention includes communicating, from the requestor electronic computing device communicatively coupled to the user electronic computing device, the electronic identity verification request to the user electronic computing device.

In accordance with a further feature of the present invention, the closed-network identity verification session further comprises communicatively coupling the user electronic computing device, the first administrator server, the second administrator server, and the requestor electronic computing device together on the network.

In accordance with another feature, an embodiment of the present invention includes providing the first administrator server, the second administrator server, and a third administrator server, wherein the data decryption key is backed-up on the third administrator server.

In accordance with yet another feature, an embodiment of the present invention includes the biometric user data which includes the digital facial image depicting the verifying user 104 taken from a physical indicia of identification 114 depicting a facial image depicting the verifying user 104, wherein the physical indicia of identification includes at least one of a government issued license and a government issued passport.

In accordance with another feature of the present invention, the computer-implemented user identity verification method further comprises a digital geolocation associated with metadata from the facial image of the verifying user taken by the camera of the electronic computing device, a physical card image depicting a facial image of the verifying user, and a digital phone verification from the electronic computing device sent by the first server.

In accordance with yet another feature of the present invention, the computer-implemented user identity verification method further comprises receiving, at the first administrator server that is communicatively coupled to the user electronic computing device over a network, asset data of the verifying user from the user electronic computing device; compiling the asset data into a single asset identity data file, associating the single asset identity data file with the verifying user, encrypting the single asset identity data file and generating a data decryption key, and segregating the single asset identity data file into a plurality of encrypted segregated asset identity data files each independently stored on the first administrator server and the second administrator server; communicating the data decryption key to the user electronic computing device for storage on the memory thereon; communicating an electronic identity verification request to the user electronic computing device, the electronic identity verification request forming a closed-network identity verification session that includes executing the identity verification software application on the user electronic computing device, communicatively coupling the user electronic computing device, the first administrator server, and the second administrator server over the network, communicating, from the user electronic computing device, at least one of secondary biometric user data of the verifying user, secondary personalized user data, and secondary unique phone data from the user electronic computing device to at least one of the first administrator server and the second administrator server, communicating the data decryption key from the user electronic computing device to at least one of the first administrator server and the second administrator server, aggregating the plurality of encrypted segregated asset identity data files stored on the first administrator server and the second administrator server to generate and decrypt, utilizing the data decryption key, the single asset identity data file, autonomously verifying an identity of the verifying user by comparing the at least one of the secondary biometric user data of the verifying user, the secondary personalized user data, and the secondary unique phone data from the user electronic computing device to at least one of the biometric user data of the verifying user from the user electronic computing device, the personalized user data from the user electronic computing device, and the unique phone data from the user electronic computing device to ascertain a data and identity match; and communicating an indication of the asset data and user identity match to the requestor electronic computing device.

In accordance with another feature of the present invention, the computer-implemented user identity verification method further comprises the closed-network identity verification session including, after the data and identity match, recompiling the single user identity data file, encrypting the single user identity data file and generating a secondary data decryption key, and segregating the single user identity data file into a plurality of secondary encrypted segregated user identity data files each independently stored on the first administrator server and the second administrator server; and communicating the secondary data decryption key to the user electronic computing device for storage on the memory thereon.

Although the invention is illustrated and described herein as embodied in a [TITLE], it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. It is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 5a, 5b, 6a, 6b, 7a, 7b, 8a, 8b, 9a, 9b, and 10 are schematic diagrams depicting an exemplary computer-implemented user identity verification method, in accordance with one exemplary embodiment of the present invention;

FIG. 12 is a process flow diagram depicting steps associated with the closed-network identity verification session, in accordance with one exemplary embodiment of the present invention.

DETAILED DESCRIPTION OF INVENTION

Figure 1:
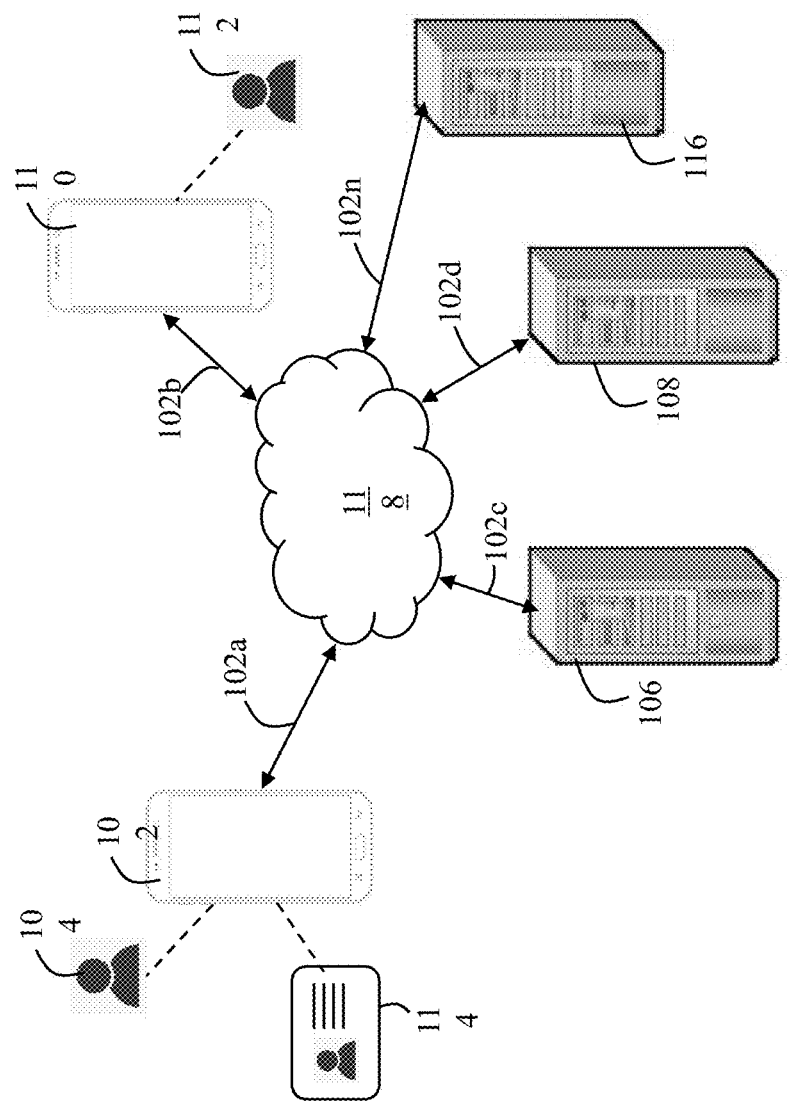
FIG. 1 is a block diagram of a computer-implemented user identity verification method, in accordance with one exemplary embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The invention described herein provides a computer-implemented user identity verification method and system that overcomes known disadvantages of those known devices and methods of this general type and that effectively and efficiently verifies a user's identity in a technical manner and with unconventional hardware. Although the invention is illustrated and described herein as embodied in a computer-implemented user identity verification method and system, it is, nevertheless, not intended to be limited to the details shown because various modifications and structural changes may be made therein without departing from the spirit of the invention. Additionally, well-known elements of exemplary embodiments of the invention will not be described in detail or will be omitted so as not to obscure the relevant details of the invention.

The attached figures are incorporated in and form part of the specification and serve to further illustrate various embodiments and explain various principles and advantages all in accordance with the present invention. Moreover, it is believed that the invention will be better understood from a consideration of the following description in conjunction with the drawing figures, in which like reference numerals are carried forward.

The present invention provides a novel and efficient computer-implemented user identity verification method 100 (hereinafter referred to simply as "the method 100" for brevity). The method 100 provides an artificial intelligence ("AI") and blockchain platform-based solution that enables any company of any size to formally identify a user's and/or client's identity before allowing them to complete any online or real-world action. The method 100 is the first contactless ID verification service for any type of transaction that does not require the physical handling of documentation. The method 100 uses a variety of biometrics which are then triangulated to produce a Digital Secured and Unforgeable ID ("DSUID") for the user, so that the business can be totally assured they are dealing with the correct person, and that they are not becoming a victim of fraud through identity theft. See FIG. 1, for example, of some of the applications and benefits. Once a user has been issued a DSUId, it then enables them to prove their identity again quickly and securely in the future to either the company who originally requested it, or indeed any other business using the method 100. In this way, the method 100 can serve as a digital passport to the end-user to safely conduct future traditional and internet transactions.

The present invention embodies several advantageous features which beneficially protect user's personally identifiable information and allow a third party to accurately and reliably verify a user's identity. The advantageous features include, without limitation, the following: using both algorithm and machine-learning AI to check the reliability of all the identification documentation that is provided by a user; using blockchain capabilities to ensure all data remains secure and unforgeable whilst offering complete traceability; using AI to give each identification document that is provided a reliability scoring including looking at its historical use; using AI to cut and split data between differing blockchain encrypted locations to ensure privacy and security at all times; and returning a simple "Yes" or "No" to confirm the client's details to a company, thereby negating the need for the company to store their client's personal data and increasing both the privacy and security for the client. The foregoing features further increase the security of a user's personal data to avoid fraud, identity theft, and other misleading information being supplied during a verification session, e.g., a meeting, sign-up process or during subsequent logins and transactions etc.

Figure 11:
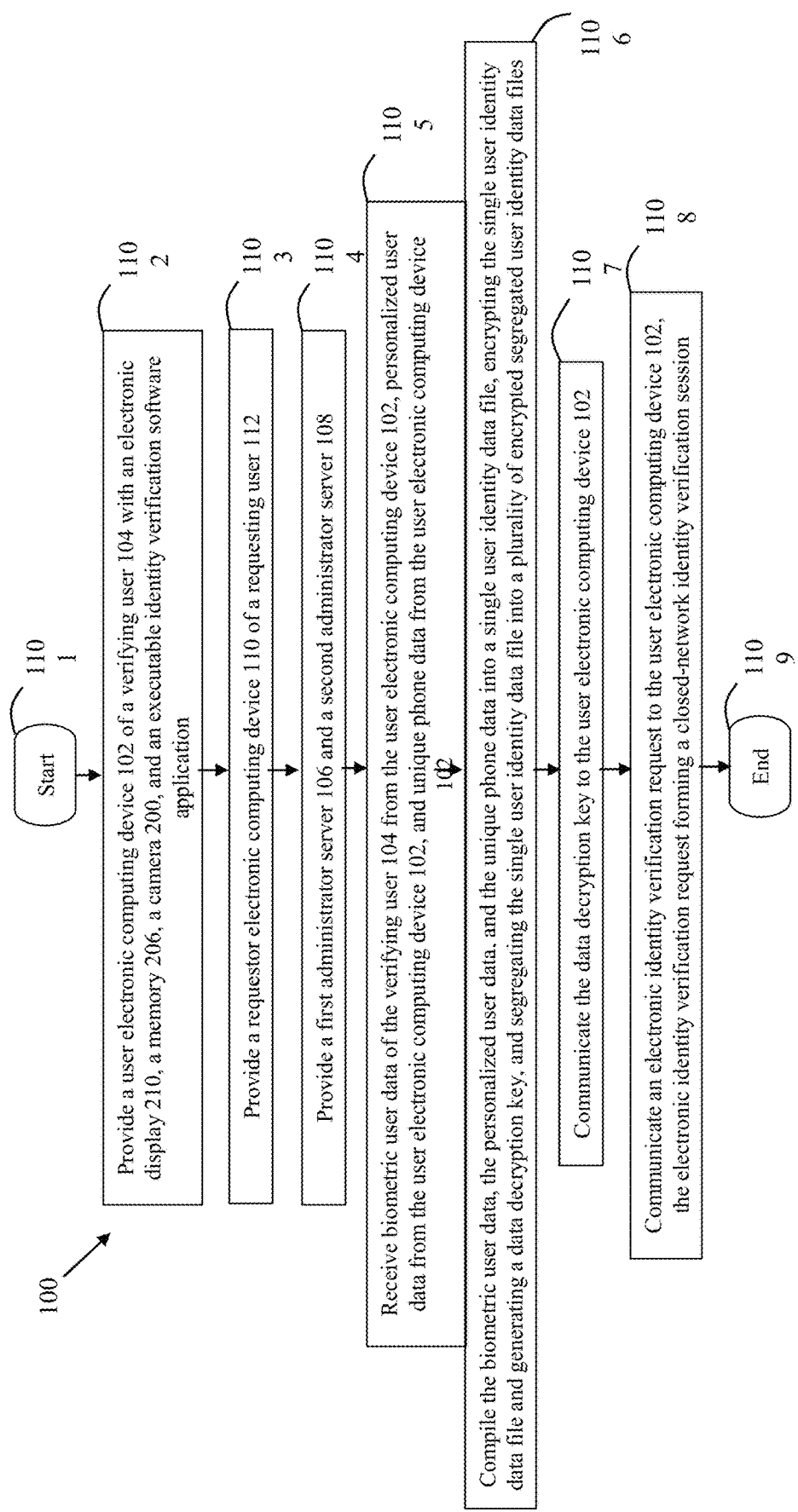
FIG. 11 is a process flow diagram depicting steps associated with the computer-implemented user identity verification method in FIG. 1, in accordance with one exemplary embodiment of the present invention.

Referring now to FIG. 1 and FIG. 11, a first Step 1102 of the method 100 comprises providing a user electronic computing device 102 of a verifying user 104 with an electronic display 210, a memory 206, a camera 200, and an executable identity verification software application resident the memory thereon, wherein "executable" is defined herein as "able to be run by a computer." In preferred embodiments, the user electronic computing device 102 may consist of a cell phone, smart phone, laptop, tablet, desktop computer, or other comparable electronic computing device. The memory 206 is non-transitory wherein "non-transitory" is defined as a resident memory. The executable identity verification software application may be made available for purchase or download from the Apple or Android store.

A next Step 1103 comprises providing a requestor electronic computing device 110 of a requesting user 112. As with the user electronic computing device 102, the requestor electronic computing device 110 may be a cell phone, smart phone, laptop, tablet, desktop computer, or other comparable electronic computing device. The requesting user 112 may be any individual, corporate entity, or government agency that seeks to obtain accurate and reliable identity verification in transactions such as, without limitation, web-based courses and exams; private portals, gambling and gaming sites; adult sites; social media sites; web forums; shopping/auction sites; or any website requiring assurances of an individual's identity. In addition to verifying identification online, the method 100 also facilitates identity verification during face-to-face encounters such as, without limitation, meetings with banking employees; doctors and medical appointments; schools and colleges; governmental agencies; solicitors; or any meeting requiring sufficient assurances of an individual's identity. In utilizing the method 100, any user can check another person's identity in a much more robust manner than just inspecting a proffered picture ID, without really knowing if it is authentic or not. Due to the ease of use of using the method 100, users can obtain identity verification in a faster period of time without implicating the legalities surrounding the copying and storing of personal data since the requesting user 112 does not need to store the produced personal data on the requesting user's 112 own servers, systems, etc.

A further Step 1104 comprises providing a first administrator server 106 and a second administrator server 108. In the depicted example, the method 100 includes the verifying user 104 and the requesting user 112 communicatively coupled together and/or to one or more server(s) 106, 108 over a network 118. The computing devices 102, 110, which may be a cellphone or tablet, for example, are operable to execute programming instructions embodied in the executable identity verification software application that can be received from the administrative servers 106, 108 via a wide area network (WAN) 118. In other embodiments, the computing devices 102, 110 are operable to execute the programming instructions received from the administrative servers 106, 108 over the WAN 118. In yet other embodiments, the executable identity verification software application is a web-based software application, a desktop software application, or a mobile device software app. In one embodiment, the WAN is the Internet. The Internet represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, the network 118 also may be implemented as a number of different types of networks, such as for example, an Intranet, a local area network (LAN), or a cellular network. FIG. 1 is intended as an example, and not as an architectural limitation for the present invention. As shown in FIG. 1, the network 118 includes connections 102*a*-*n*, which are the medium used to provide communication links between various devices and computers connected together within the network 118. The connections 102*a*-*n* may be wired or wireless connections, but said connections are preferably wireless.

A few exemplary wired connections are cable, phone line, and fiber optic. Exemplary wireless connections include radio frequency (RF) and infrared radiation (IR) transmission. Many other wired and wireless connections are known in the art and can be used with the present invention.

Figure 2:
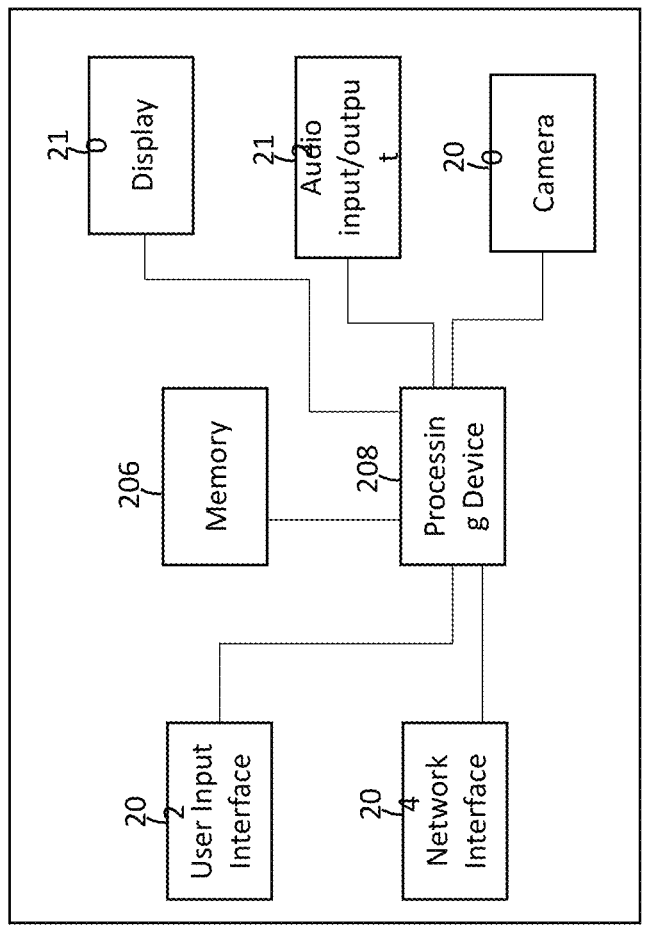
FIG. 2 is a block diagram of an exemplary computing device utilized in the computer-implemented user identity verification method depicted in FIG. 1.

With reference now to FIG. 2, the computing devices 102, 110 are illustrated in a block diagram. The computing devices 102, 110 may include a camera 200, a user input interface 202, a network interface 204, a memory 206, a processing device 208, a computer display 210, and an audio input/output 212. The camera 200 may include a camera lens 201 and may be operable to capture still images, as well as, video. The camera 200 is preferably a digital camera so that the images may be stored in the memory 206 and processed by the processing device 208 on a user's cellular phone and/or remotely at the administrator servers 106, 108. The camera 200 may be communicatively coupled to a microphone for capturing audio, as well as, simultaneous visual video images.

The user input interface 202 functions to provide the user a method of providing input to the personal computing devices. The user input interface 202 may also facilitate interaction between the user's computing devices and/or the servers 106, 108. The user input interface may be a keypad providing a variety of user input operations. For example, the keypad may include alphanumeric keys for allowing entry of alphanumeric information (e.g., telephone numbers, contact information, content for display, text, etc.). The user input interface 202 may include special function keys (e.g., a camera shutter button, volume control buttons, back buttons, home button, etc.), navigation and select keys, a pointing device, and the like. Keys, buttons, and/or keypads may be implemented as a touchscreen associated with the computer display 210. The touchscreen may also provide output or feedback to the user, such as haptic feedback or orientation adjustments of the keypad according to sensor signals received by motion detectors, such as an accelerometer, located within the devices.

The network interface 204 may include one or more network interface cards (NIC) or a network controller. In some embodiments, the network interface 204 may include a personal area network (PAN) interface. The PAN interface may provide the capability for the user's computing devices to network using a short-range communication protocol, for example, a Bluetooth communication protocol. The PAN interface may permit one personal computing device to connect wirelessly to another personal computing device via a peer-to-peer connection.

The network interface 204 may also include a local area network (LAN) interface. The LAN interface may be, for example, an interface to a wireless LAN, such as a Wi-Fi network. The range of the LAN interface may generally exceed the range available via the PAN interface. Typically, a connection between two electronic devices via the LAN interface may involve communication through a network router or other intermediary device.

Additionally, the network interface 204 may include the capability to connect to a wide area network (WAN) via a WAN interface. The WAN interface may permit a connection to, for example, a cellular mobile communications network. The WAN interface may include communications circuitry, such as an antenna coupled to a radio circuit having a transceiver for transmitting and receiving radio signals via the antenna. The radio circuit may be configured to operate in a mobile communications network, including but not limited to global systems for mobile communications (GSM), code division multiple access (CDMA), wideband CDMA (WCDMA), and the like.

The computing devices 102, 110 of the users 104, 112 may also include a near field communication (NFC) interface. The NFC interface may allow for extremely close-range communication at relatively low data rates (e.g., 424 kb/s). The NFC interface may take place via magnetic field induction, allowing the NFC interface to communicate with other NFC interfaces located on other mobile computing devices or to retrieve information from tags having radio frequency identification (RFID) circuitry. The NFC interface may enable initiation and/or facilitation of data transfer from and to the personal computing devices with an extremely close range (e.g., 4 centimeters).

A memory 206 associated with the user's computing devices may be, for example, one or more buffer, a flash memory, or non-volatile memory, such as random-access memory (RAM). The computing devices 102, 110 may also include non-volatile storage. The non-volatile storage may represent any suitable storage medium, such as a hard disk drive or non-volatile memory, such as flash memory. The processing device 208 can be, for example, a central processing unit (CPU), a microcontroller, or a microprocessing device, including a "general purpose" microprocessing device or a special purpose microprocessing device. The processing device 208 executes code stored in memory 206 to carry out operation/instructions of the mobile computing devices 102, 110. The processing device 208 may provide the processing capability to execute an operating system, run various applications, and provide processing for one or more of the techniques described herein.

In preferred embodiments, the first administrative server 106 is located in a geographically remote and independent location with respect to the second administrative server 108 to further protect user data in the event that one of the servers 106, 108 are destroyed, damaged, hacked, or otherwise compromised. In exemplary embodiments, the user electronic computing device 102 and the requestor electronic computing device 110 are located in geographically remote and independent locations with respect to the first administrator server 106 and the second administrator server 108 to further aid in protecting user data.

Figure 3:
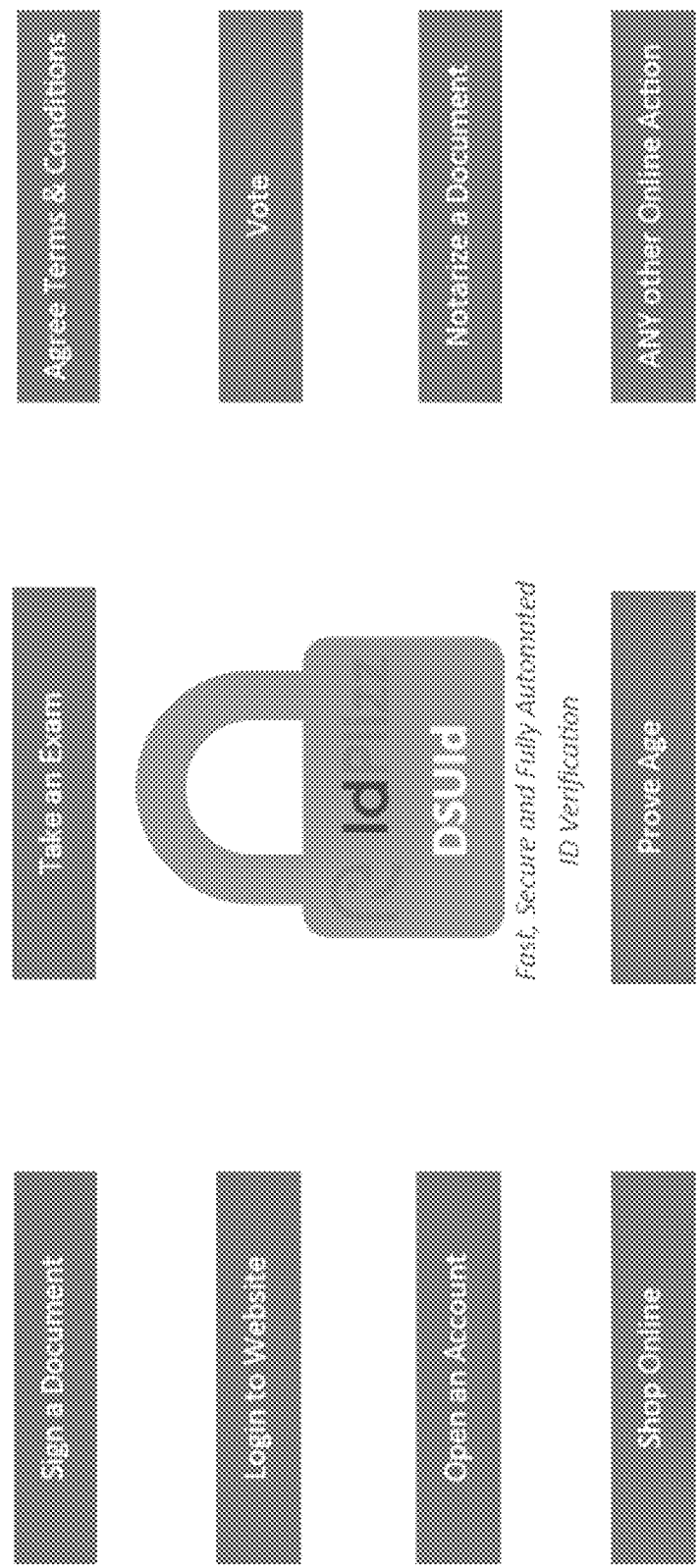
FIG. 3 is schematic diagram depicting exemplary applications for the computer-implemented user identity verification method, in accordance with one embodiment of the present invention.
Figure 6B:
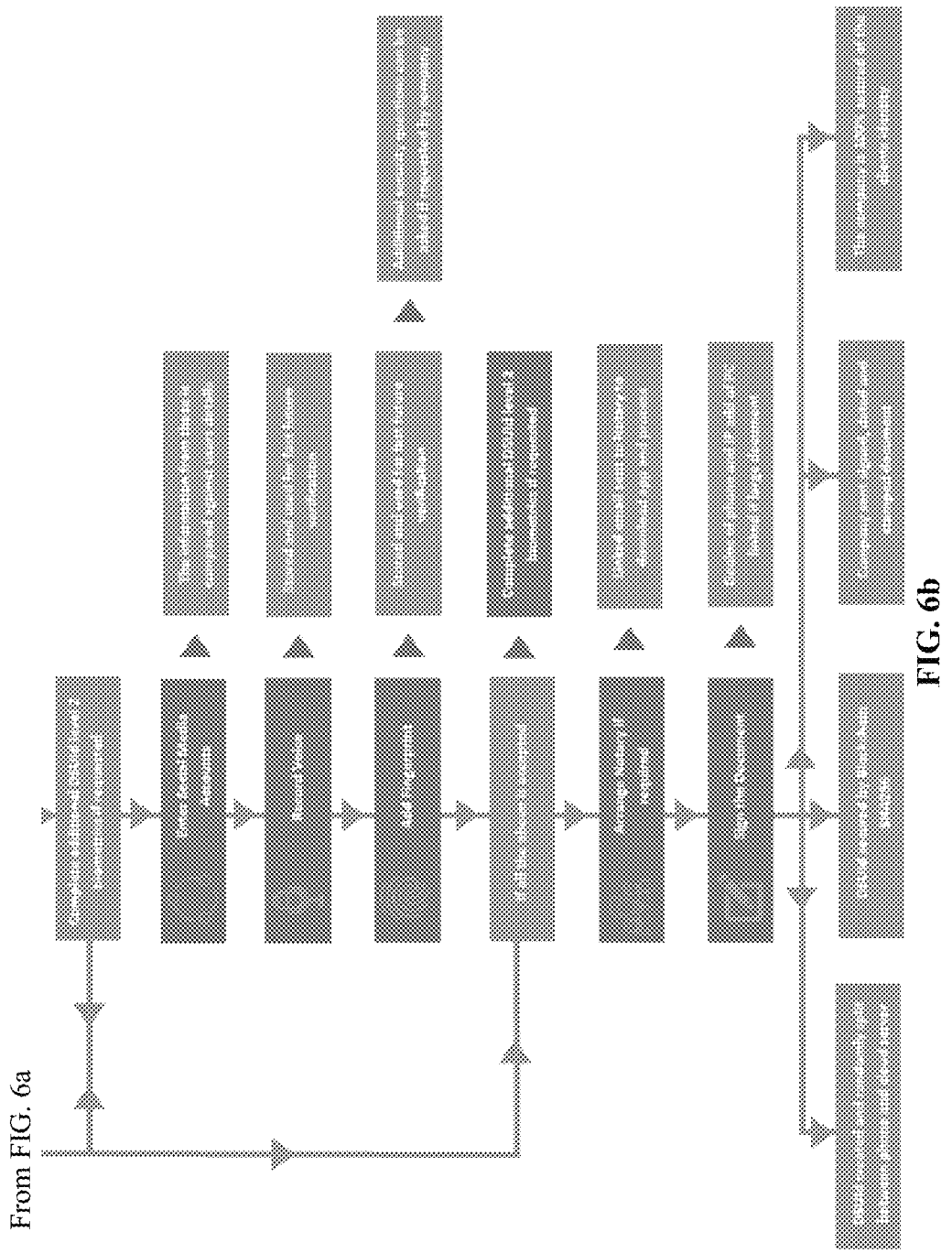
Figure 7A:
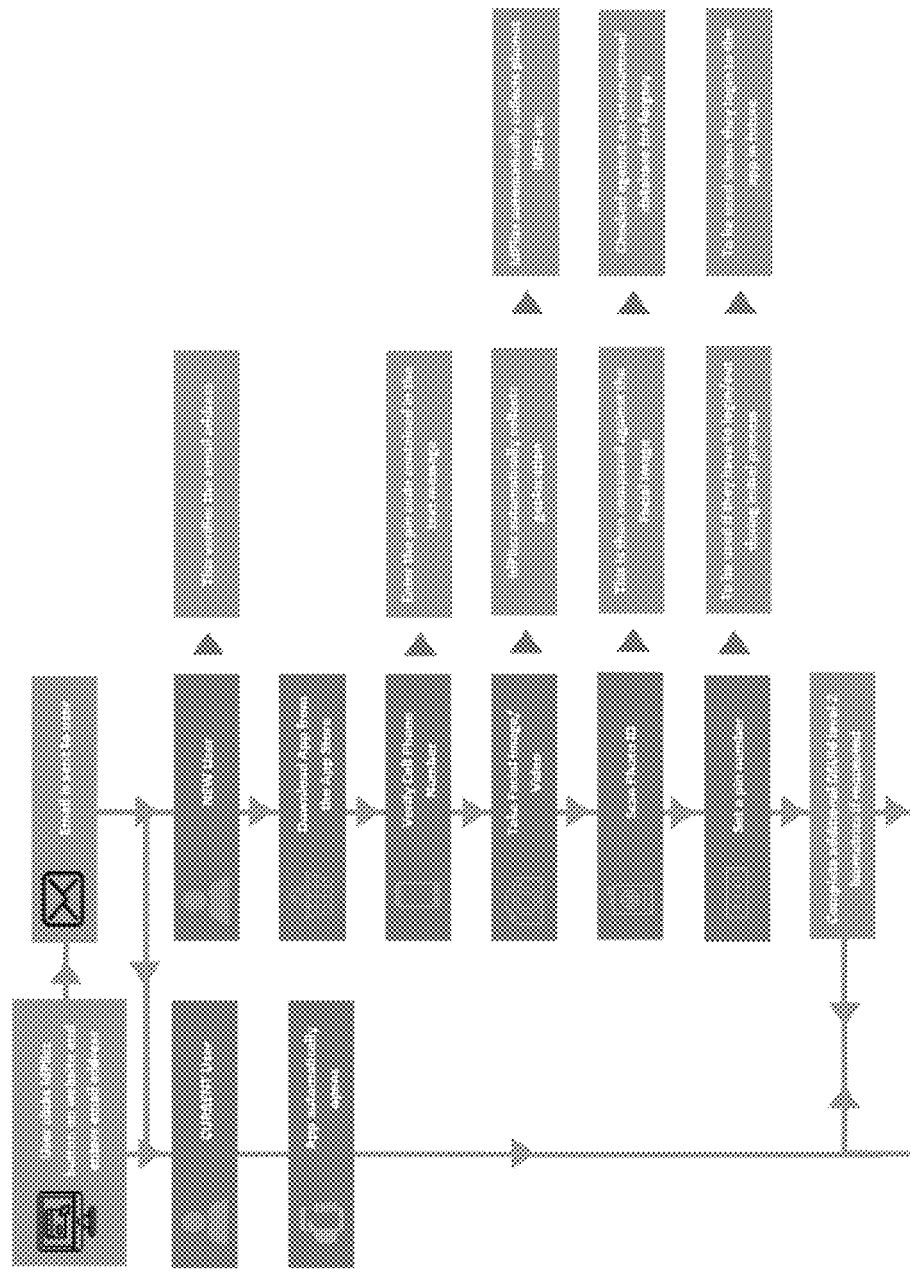
Figure 7B:
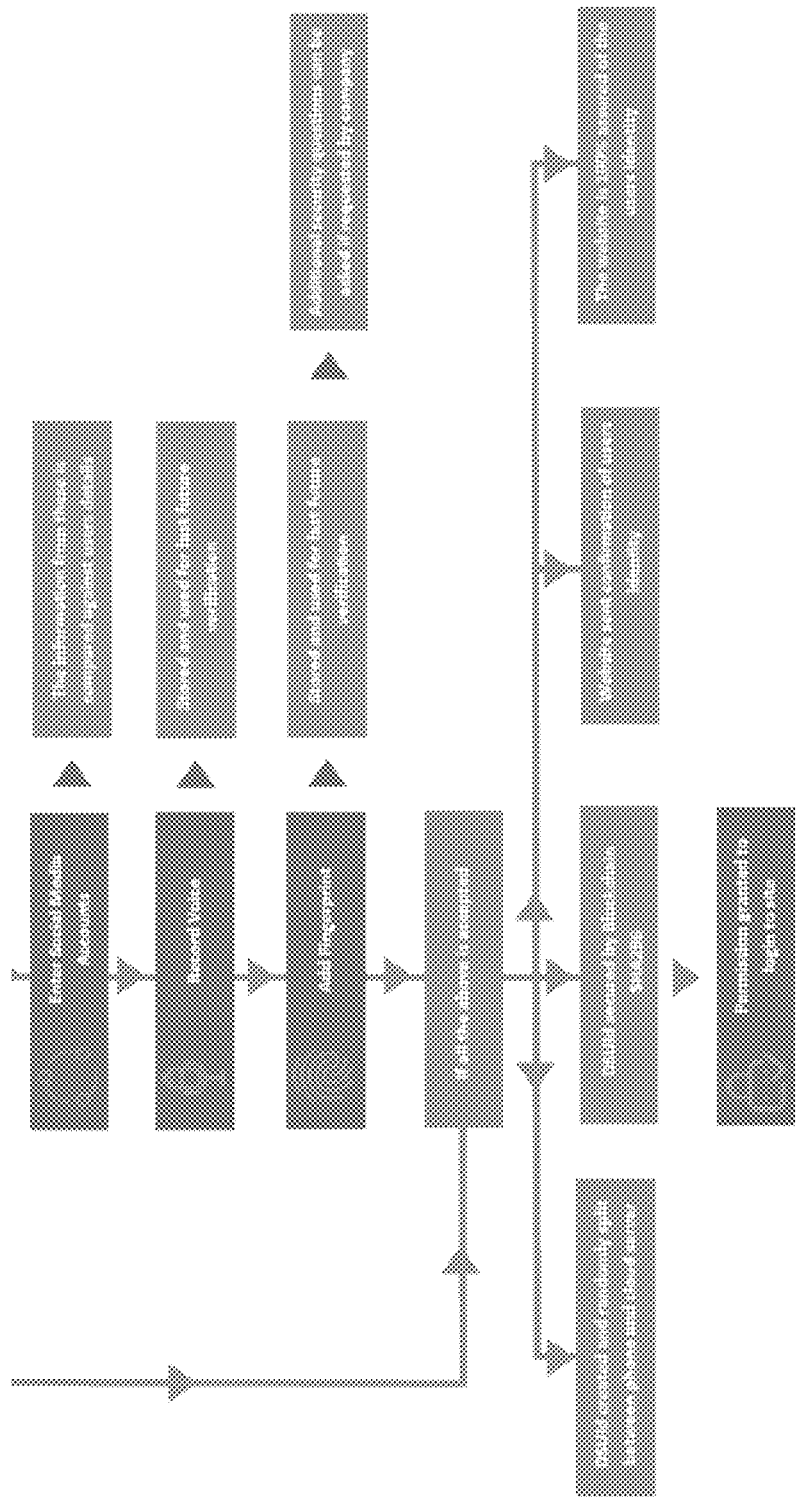
Figure 8A:
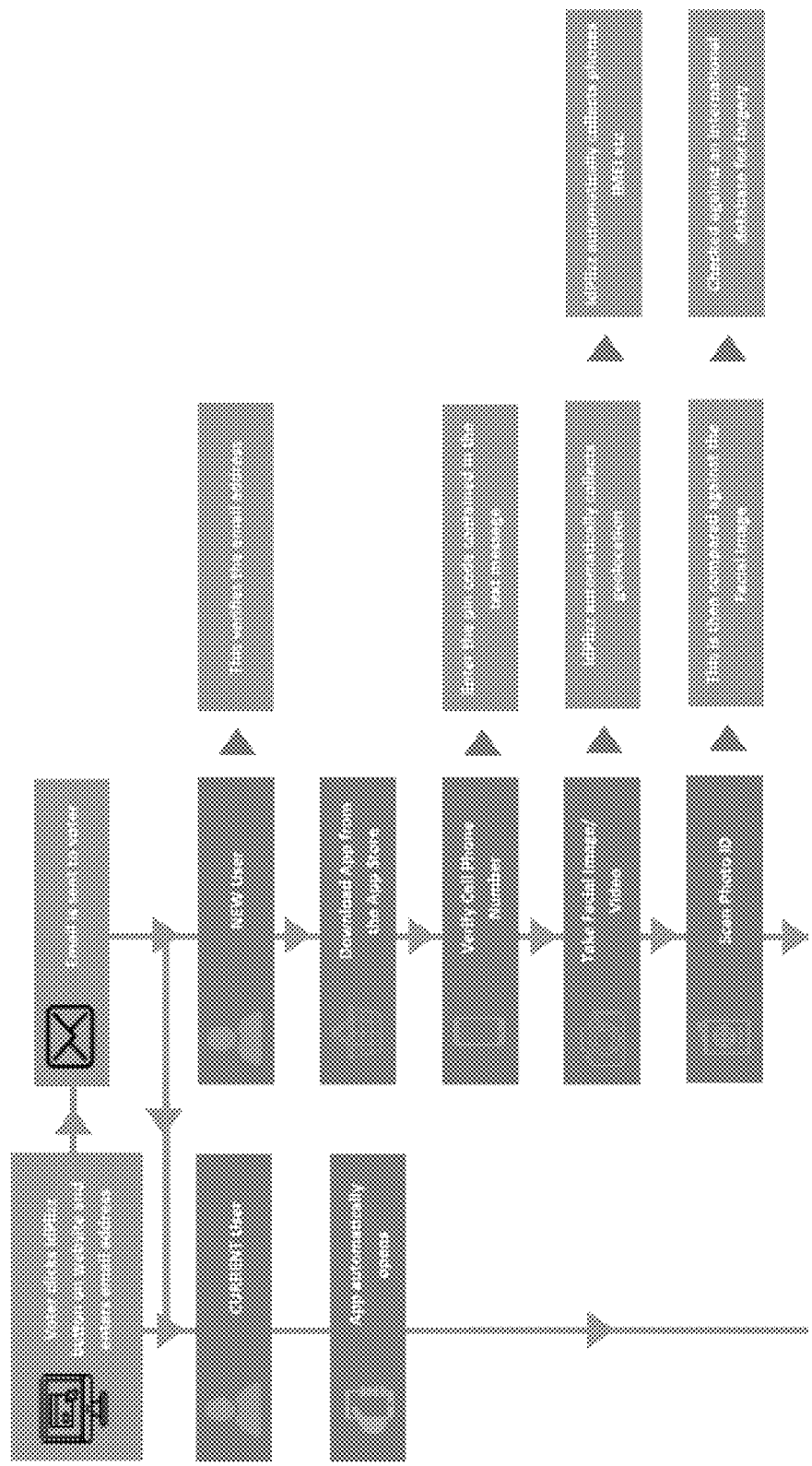
Figure 8B:
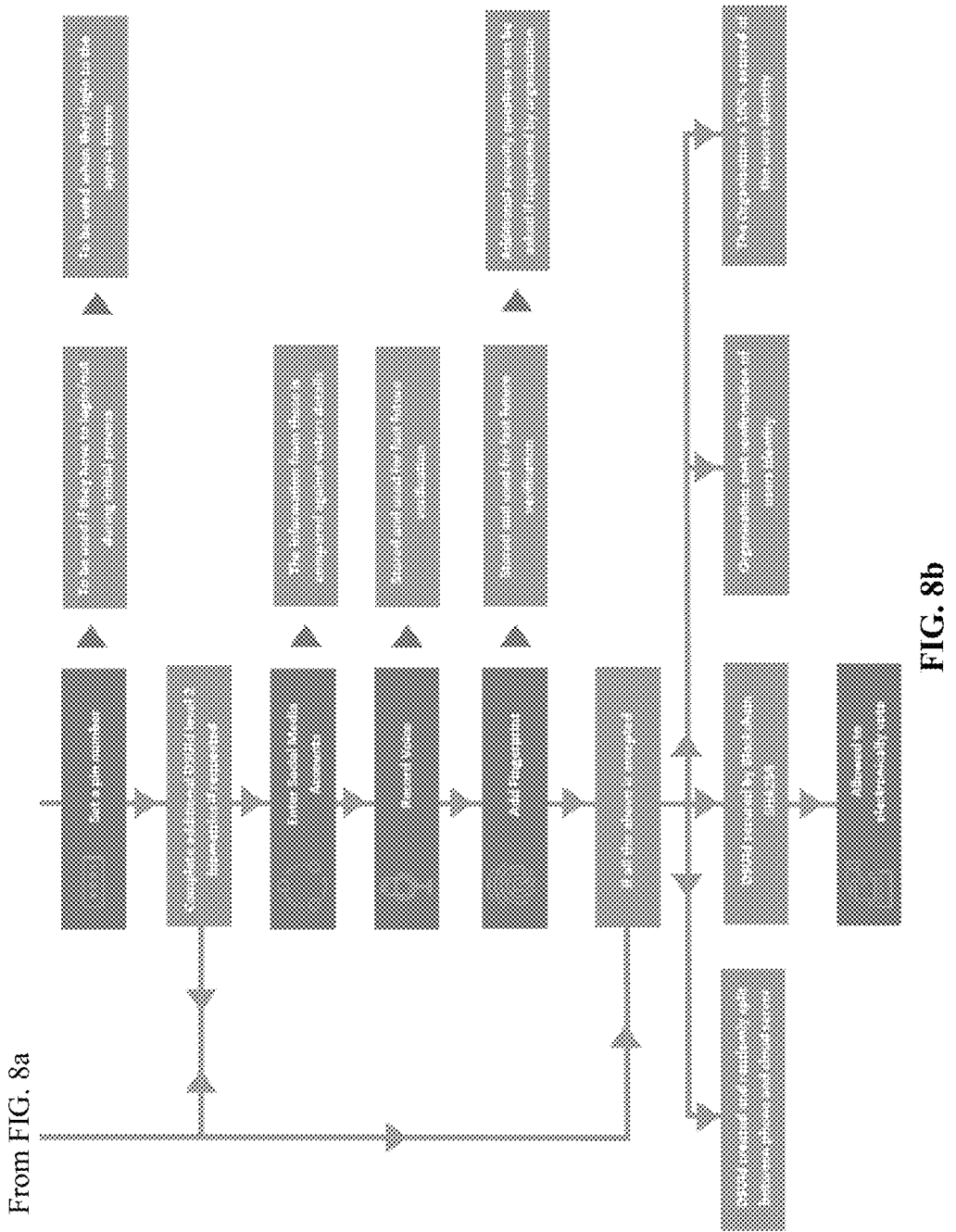
Figure 9A:
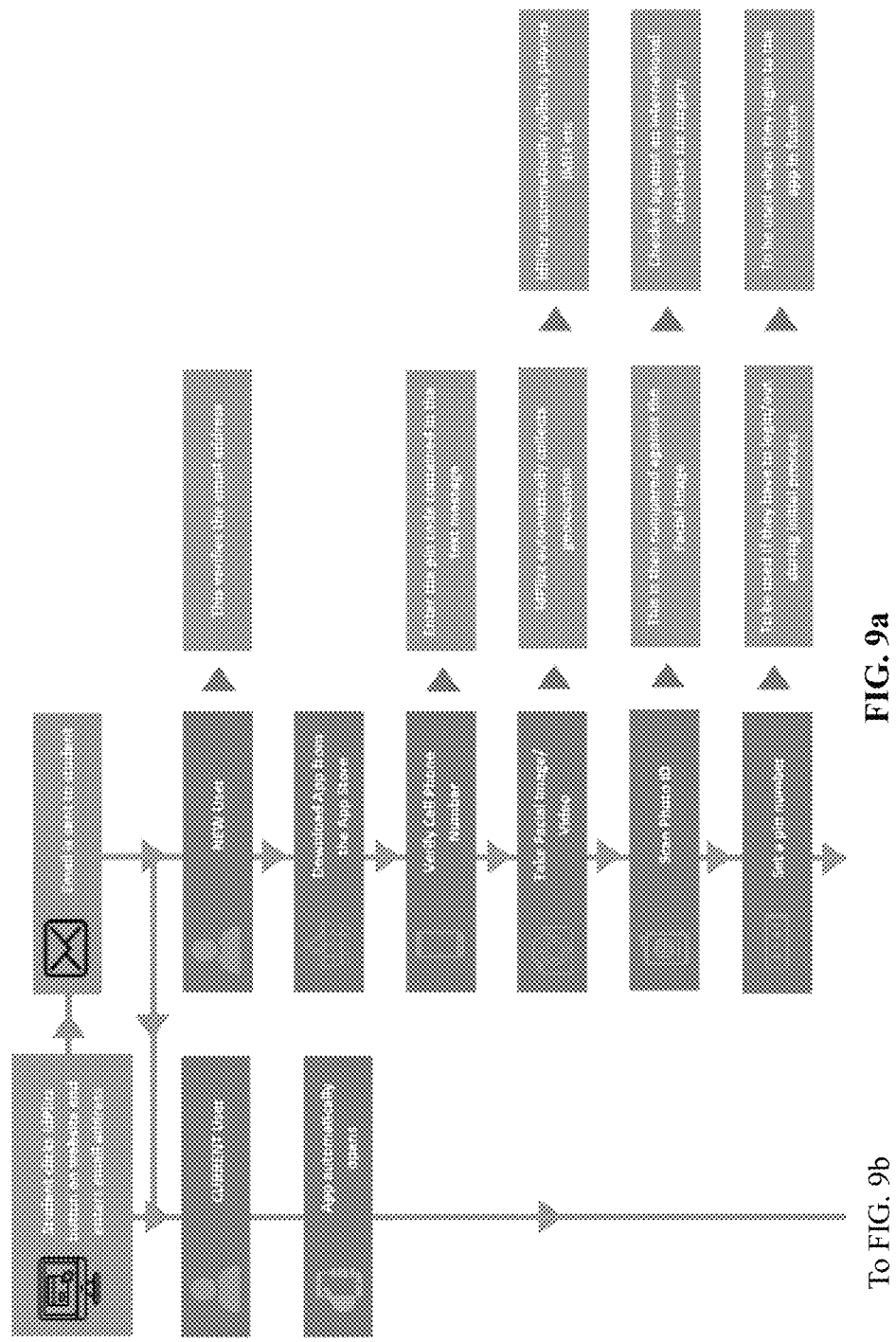
Figure 9B:
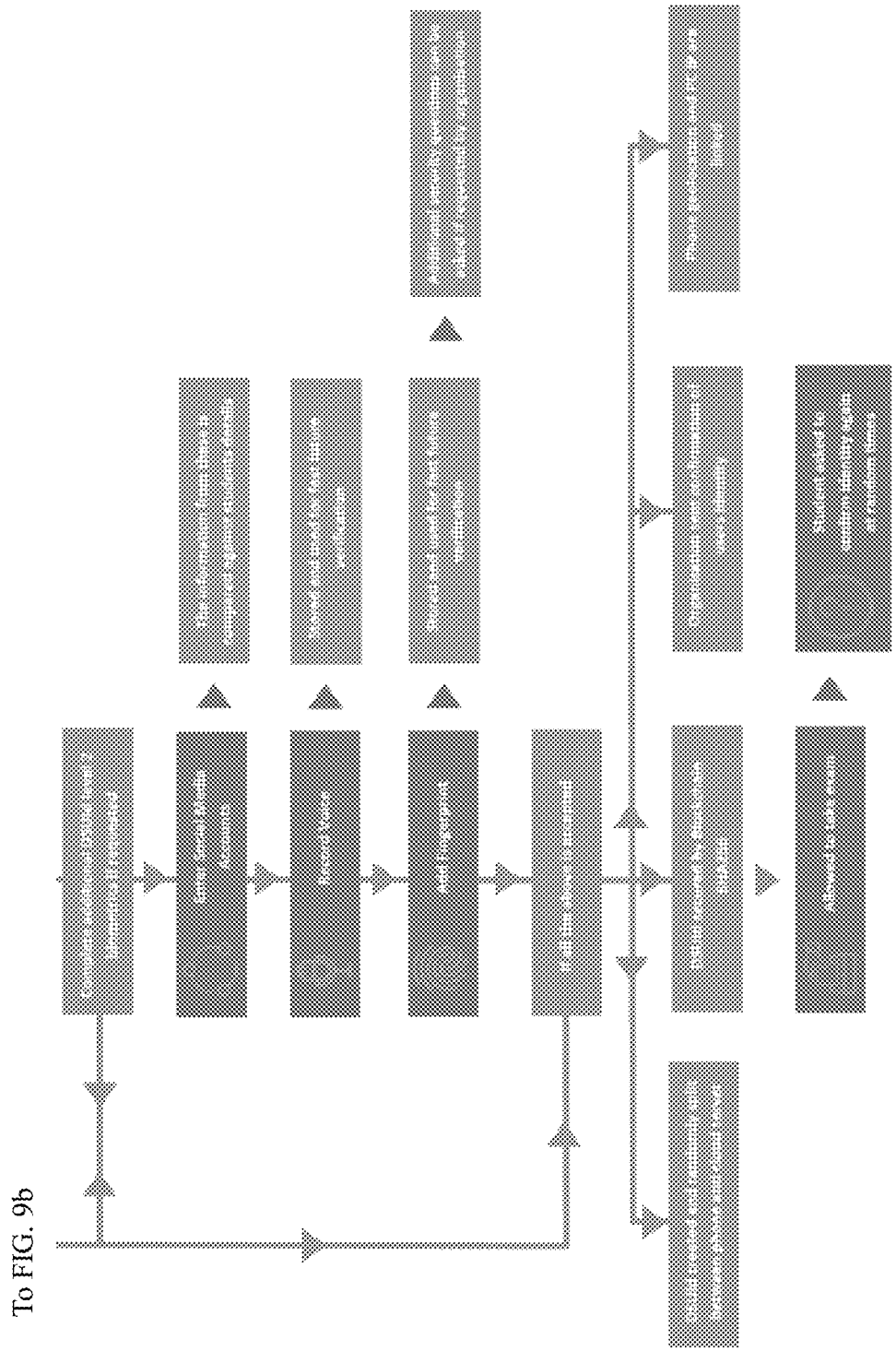
Figure 10:
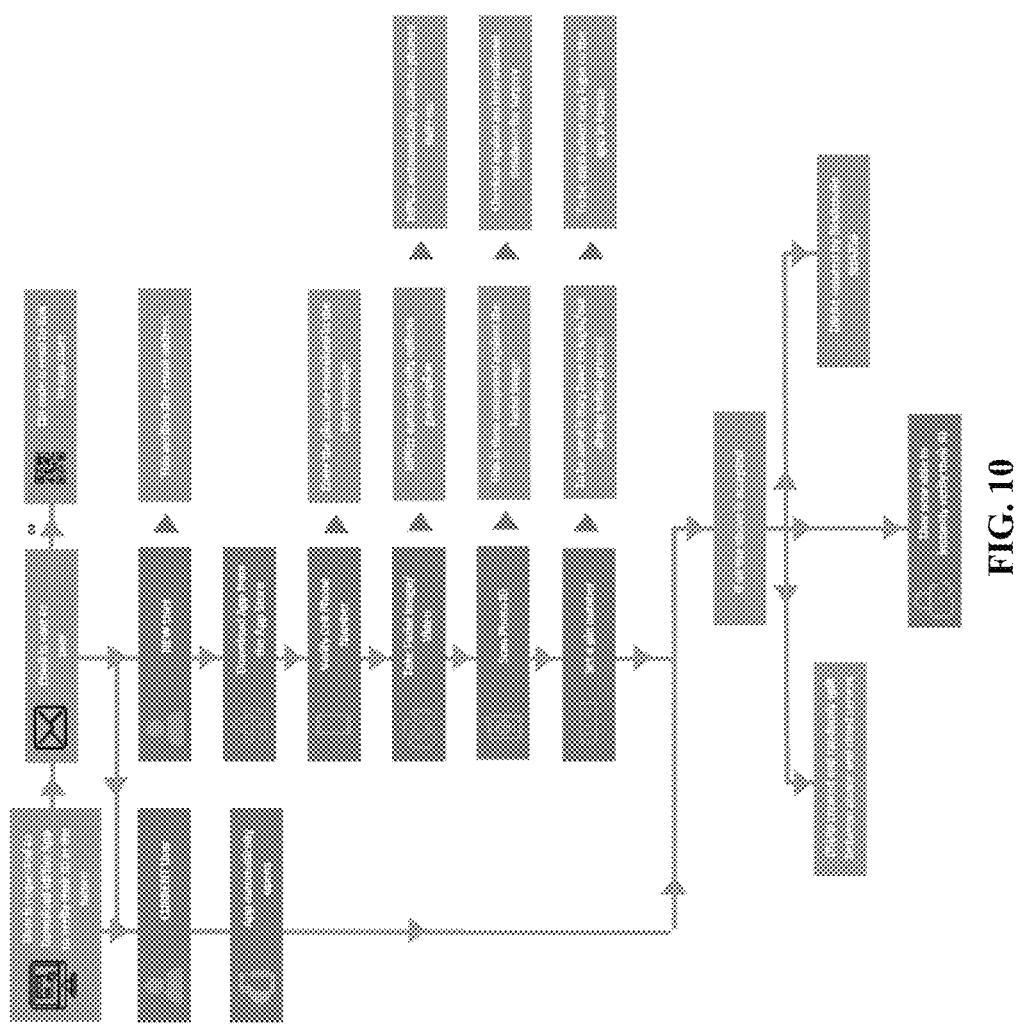

As best depicted in FIG. 3, the method 100 of verifying a user's identity facilitates the completion of various tasks and activities including, without limitation, signing and/or notarizing documents, logging in to a website, shopping online, taking an exam, voting, etc. As such, the applicability of the method 100 spans across a wide variety of industries, spheres, and areas of business and everyday life, in general. FIGS. 6*a-b* depict the Steps undertaken to execute the method 100 from the perspective of the requesting user 112, e.g., a business, corporate entity, government agency, individual, etc. FIGS. 7*a*-10 depicts the Steps undertaken to execute the method 100 from the perspective of the verifying user 104. In FIGS. 7*a-b*, the verifying user 104 is granted permission to log into a website upon the successful completion of the method 100 such that the verifying user 104 achieves a data and identity match. In FIGS. 8*a-b*, the data and identity match achieved by the verifying user 104 grants the verifying user 104 permission to vote in an election. In FIGS. 9*a-b*, the verifying user 104 is a student whose data and identity match permits the student to take an exam. In FIG. 10, the verifying user's 104 use of the method 100 allows the verifying user 104 to achieve a data and identity match to verify the user's identity and achieve any number of tasks and activities.

Figure 5A:
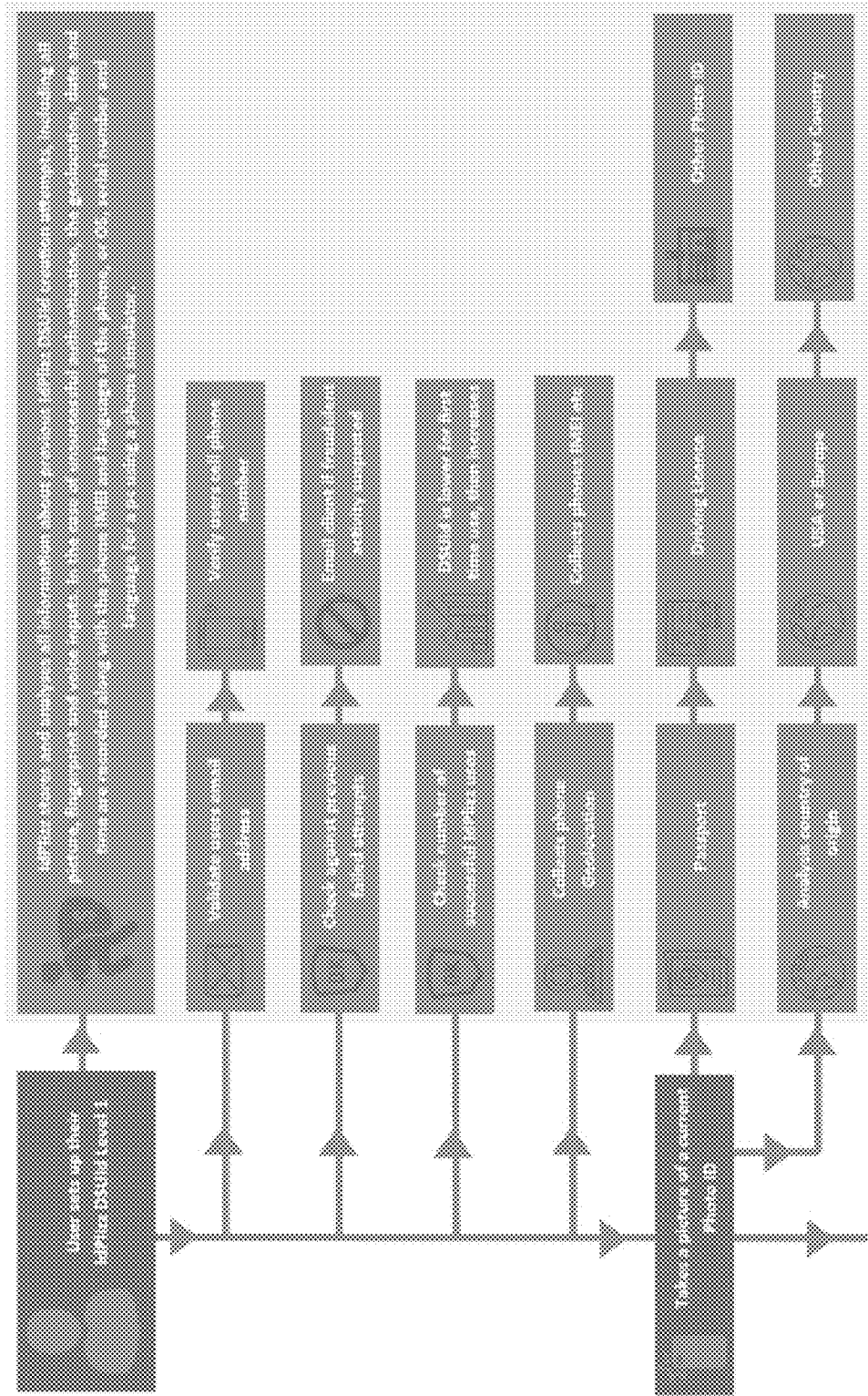
Figure 5B:
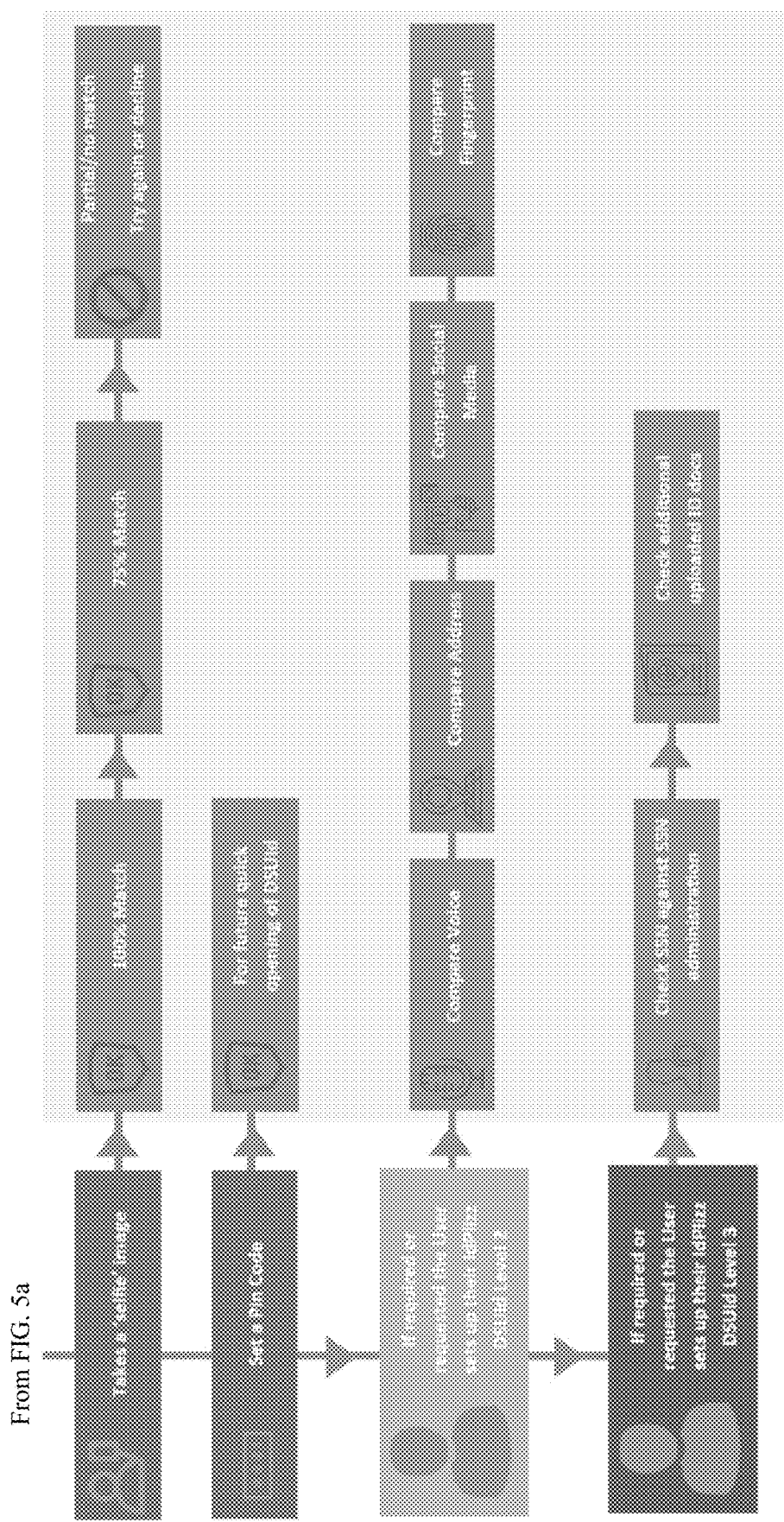

The Steps comprising the method 100 are outlined in FIGS. 5*a-b* and FIG. 11, though the specific order of the Steps as depicted in the figures and as outlined herein may vary in alternate embodiments and one or more Steps may be combined or consolidated to achieve the same result in fewer Steps.

In accordance with a next Step 1105, the method 100 comprises receiving, at the first administrator server 106 that is communicatively coupled to the user electronic computing device 102 over the network 118, biometric user data of the verifying user 104 from the user electronic computing device 102, personalized user data from the user electronic computing device 102, and unique phone data from the user electronic computing device 102. In one embodiment, the biometric user data of the verifying user 104 comprises the facial scan or image of the verifying user 104, which is captured by engaging the camera 200 of the user electronic computing device 102 and scanning the same over the face of the verifying user 104. In a second embodiment, the biometric user data including the digital facial image depicting the verifying user 104 is taken from a physical indicia of identification 114 depicting a facial image depicting the verifying user 104, the physical indicia of identification including at least one of a government issued license and a government issued passport, i.e., including either or both the government issued license or the government issued passport. In alternate embodiments, the biometric user data of the verifying user 104 may extend to any body measurement or calculation relating to the same such as, by way of example and without limitation, any of the following: fingerprints, DNA, palm prints, iris recognition, hand geometry, retina, body odor, palm veins, ear form, keyboard strokes, gait analysis, voice, body geometry, etc. Typically, the verifying user 104 will be prompted and required to scan a recent official photo ID, which is then checked for forgeries against an international database covering over 180 countries. The verifying user 104 will then be prompted or required to take a facial image or video by engaging the camera 200, which facial image or video is then compared against the scanned recent official photo ID for an identity match. In an exemplary embodiment, the unique phone data includes, without limitation, the International Mobile Equipment Identity ("IMEI") number that is uniquely associated with the user electronic computing device 102 and the geolocation of the user electronic computing device 102. Specifically, the IMEI is a unique 15-digit number that identifies a specific mobile device. This Step may comprise only receiving, at the first administrator server 106 that is communicatively coupled to the user electronic computing device 102 over a network, biometric user data of the verifying user 104 from the user electronic computing device 102, particularly where neither the verifying user 104 nor the requesting user 112 have opted in for data above and beyond that of the biometric user data of the verifying user 104.

In a preferred embodiment of the present invention, a digital geolocation associated with metadata from the facial image of the verifying user 104 taken by the camera of the electronic computing device 102, a physical card image depicting a facial image of the verifying user, and a digital phone verification from the electronic computing device 102 is sent or communicated by the first server 106.

The nature and extent of the personalized user data from the user electronic computing device 102 may vary depending on the preference of the verifying user 104, i.e., which personal data and information the verifying user 104 wishes to input, or on the preference of a requesting user 112 who communicates an electronic identity verification requests, i.e., the corporate entity, government agency, or individual seeking verification of the identity of the verifying user 104. The personalized user data may include, without limitation, a user's email address, home address, signature, cell phone number, passport, driver's license, pin code, voice recording, social security number, other biometric data, or other state- or government-issued ID. The personalized user data may be selectively modified or adjusted to account for differing levels of security identification that are available. Specifically, the personalized user data may be divided up into several categories, each of which reflects progressively more personal or sensitive data of the verifying user 104. In an exemplary embodiment of the present invention, there are three categories of personalized user data which may be referred to herein as DSUId level 1, DSUId level 2 and DSUId level 3. DSUId level 1 collects sufficient information, i.e., biometric user data and/or personalized user data, to securely identify the individual. DSUId level 2 collects more stringent information, i.e., biometric user data and/or personalized user data, that further identifies the individual. DSUId Level 1, i.e., the minimum required, may include, without limitation, the following: email address confirmation; cell phone number confirmation; scanning a photo ID; taking a facial image or video; geolocation (automatically collected); phone information such as IME (automatically collected); setting a Pin Code (to speed up future use); agreement to terms and conditions tick box/electronic signature. DSUId Level 2 generally includes all of the information listed under DSUId Level 1 as well as at least one of the following: social media accounts; home address; fingerprint scan (to speed up future transactions); and/or voice recording (to speed up future transactions). DSUId Level 3 generally includes all of the information listed under DSUId Level 1 and DSUId 2 as well as at least one of the following: social security number; uploading additional Photo ID; uploading additional documentation. During the identification process, the requesting user 112 can also request the verifying user 104 supply their signature or any other information they require. If the verifying user 104 ever wants to update their DSUId for any reason, one or more steps may be repeated to ensure the user's identity. A DSUId can only be improved once set up, but not altered. This therefore makes the DSUId completely secure in identifying the verifying user 104, both in the first instance and then again for future transactions. In one embodiment, the only data communicated to the first administrator server 106 is biometric user data of the verifying user 104 from the user electronic computing device 102, i.e., no additional personalized user data is required or communicated to the first administrator server 106 in order to accurately and reliably verify the identity of a verifying user 104.

A next Step 1106 comprises compiling the biometric user data, the personalized user data, and the unique phone data into a single user identity data file, encrypting the single user identity data file and generating a data decryption key, and segregating the single user identity data file into a plurality of encrypted segregated user identity data files each independently stored on the first administrator server 106 and the second administrator server 108. As used herein, encryption is defined as the process of encoding information by converting the original representation of the information, known as plaintext, into an alternative form known as ciphertext. Ideally, only authorized parties can decipher a ciphertext back to plaintext and access the original information. In a preferred embodiment, the encryption used to encrypt the single user identity data file is Secure Hash Algorithm 2 (SHA-2), a set of cryptographic hash functions built using the Merkle-Damgård construction, from a one-way compression function itself built using the Davies-Meyer structure from a specialized block cipher. In alternate embodiments, the specific form or type of encryption may vary but the function and purpose remain the same, i.e., to protect and secure the single user identity data file such that only authorized users who have possession, custody, or control over the data decryption key can access and view the single user identity data file in a coherent and readily understandable format. Once the single user identity data file is encrypted, it is then segregated in its encrypted form into a plurality of encrypted segregated user identity data files each independently stored on the first administrator server 106 and the second administrator server 108. While the single user identity data file is segregated into the plurality of encrypted segregated user identity data files each independently stored on the first and second administrator servers 106, 108, those of skill in the art will appreciate that additional segregation over additional servers may be utilized and still covered under said scope.

Once segregated, the single user identity data file is unable to be read in its original plaintext format to ascertain the biometric user data, the unique phone data, and the personalized user data unless and until the single user identity data file is aggregated back together to form the composite single user identity data file and decrypted using the data decryption key. By encrypting the single user identity data file, segregating it into a plurality of encrypted segregated user identity data files, and independently storing the plurality of encrypted segregated user identity data files on both the first administrator server 106 and the second administrator server 108, the single user identity data file is cloaked with additional layers of data protection and security operably configured and designed to prevent unauthorized access to the single user identity data file. Said differently, each of the foregoing measures independently functions to ensure the integrity, security, and protection of the single user identity data file and, when all of the measures are utilized or applied contemporaneously, the overall integrity, security, and protection of the single user identity data file is further solidified.

In accordance with a further Step 1107, the method 100 further comprises communicating the data decryption key to the user electronic computing device 102 for storage on the memory 206 thereon. In storing the data decryption key on the memory 206 of the user electronic computing device 102, only the verifying user 104, or another authorized user of the user electronic computing device 102, can decrypt the encrypted single user identity data file. Even if the user electronic computing device 102 falls into the hands of an unauthorized user, however, the unauthorized user is unable to obtain the decrypted version of the single user identity data file due to additional data security and protection measures in place (and described below). In one embodiment, the data decryption key identifies where to source the plurality of encrypted segregated user identity data files from, while in other embodiments, the data decryption key is sent along with another identifier, e.g., the verifying user's 104 phone information, account information, etc.

A next Step 1108 entails communicating an electronic identity verification request to the user electronic computing device 102, wherein the electronic identity verification request is generated by the requesting user 112 to verify the identity of the verifying user 104. In one embodiment, the electronic identity verification request will be generated by the requesting user 112 by logging into the administrator's system, web-based platform, and/or software application that is communicatively coupled to the first administrator server 106, wherein a closed-network identity verification session 1200 is formed when the electronic identity verification request is generated by the requesting user 112. In other embodiments, the electronic identity verification request will be generated without the requesting user 112 having to log into any system, i.e., the electronic identity verification request will simply include a hyperlink for the verification user to log into the administrator server and preset requirements for verification and the contact for the requesting user 112.

The process flow diagram in FIG. 12 best depicts the Steps comprising the closed-network identity verification session 1200. The electronic identity verification request forms a closed-network identity verification session 1200, wherein closed-network is defined as a network that is not open or readily accessible to the public, that includes the Step 1202 of executing the identity verification software application on the user electronic computing device 102. In accordance with this Step, the customer may receive an automated email containing a token and button/link to confirm their identity. If they have used the identity verification software application before, the identity verification software application will automatically open. If the user is a new user, the email points them to download the executable identity verification software application from the Apple or Android store and may prompt the customer to enter a short numeric code that was sent to the customer's email or cell phone. This also confirms to the executable identity verification software application that the user's email address and/or cell phone number is valid.

The closed-network identity verification session 1200 further includes the Step 1203 of communicatively coupling the user electronic computing device 102, the first administrator server 106, and the second administrator server 108 over the network 118, and a next Step 1204 of communicating, from the user electronic computing device 102, at least one of secondary biometric user data of the verifying user 104, secondary personalized user data, and secondary unique phone data from the user electronic computing device 102 to at least one of the first administrator server 106 and the second administrator server 108. Said differently, the verification session may include communicating, from the user electronic computing device 102, one or more of the secondary biometric user data of the verifying user 104, secondary personalized user data, and/or secondary unique phone data from the user electronic computing device 102 to at least one of the first administrator server 106 and the second administrator server 108. The secondary biometric user data of the verifying user 104, secondary personalized user data, and/or secondary unique phone data from the user electronic computing device 102 is generated in response to the electronic identity verification request and is intended to facilitate the identity verification of the verifying user 104. In a preferred embodiment of the present invention, the closed-network identity verification session further comprises communicatively coupling the user electronic computing device 102, the first administrator server 106, the second administrator server 108, and the requestor electronic computing device 110 together on the network 118.

The closed-network identity verification session 1200 further includes the Step 1205 of communicating the data decryption key from the user electronic computing device to at least one of the first administrator server 106 and the second administrator server 108, and a further Step 1206 of aggregating the plurality of encrypted segregated user identity data files stored on the first administrator server 106 and the second administrator server 108 to generate and decrypt, utilizing the data decryption key, the single user identity data file. In another embodiment, the method 100 may further comprise a third administrator server 116, wherein the data decryption key is backed-up on the third administrator server 116 as opposed to on the user electronic computing device. This feature beneficially provides for greater administrative oversight and added protection over the data decryption key, particularly where the user electronic computing device is susceptible to being destroyed, damaged, hacked, or otherwise compromised.

In accordance with the present invention, the verification session 1200 includes a Step 1207 of autonomously verifying an identity of the verifying user 104 by comparing the at least one of the secondary biometric user data of the verifying user 104, the secondary personalized user data, and the secondary unique phone data from the user electronic computing device 102 to at least one of the biometric user data of the verifying user 104 from the user electronic computing device 102, the personalized user data from the user electronic computing device 102, and the unique phone data from the user electronic computing device 102 to ascertain a data and identity match, and a final Step 1208 of communicating an indication of the data and identity match to the requestor electronic computing device 110. As used herein, autonomously may include, for example and without limitation, using programmed computer algorithms on the servers 106, 108. An algorithm is defined as a set of unambiguous instructions that a mechanical computer can execute. In an exemplary embodiment, the indication of the data and identity match to the requestor electronic computing device 110 is discrete and does not include any user-identifying information that would be personal to further protect the privacy of the verifying user 104 and its data.

In accordance with one embodiment of the present invention, the biometric user data of the verifying user 104 received from the user electronic computing device 102 includes a digital facial image depicting the verifying user 104 taken by the camera 200 of the user electronic computing device 102 and the closed-network identity verification session 1200 further comprises taking a picture of the verifying user 104 from the camera 200 of the user electronic computing device 102, the picture of the verifying user 104 from the camera of the user electronic computer device 102 forming part of the secondary biometric user data of the verifying user 104 and communicating the at least one of a secondary biometric user data of the verifying user 104 to the at least one of the first administrator server 106 and the second administrator server 108; and autonomously verifying an identity of the verifying user 104 by comparing the picture of the verifying user 104 from the camera of the user electronic computer device 102 forming part of the secondary biometric user data of the verifying user 104 to the digital facial image depicting the verifying user 104 taken by the camera 200 of the user electronic computing device 102 to ascertain the data and identity match. As with the biometric user data of the verifying user 104 and the personalized user data from the user electronic computing device 102, the digital facial image is generally extracted or derived from a physical form of identification, e.g., passport, driver's license, or other government issued form of identification. This comparison of the picture of the verifying user 104 from the camera 200 of the user electronic computer device 102 forming part of the secondary biometric user data of the verifying user 104 to the digital facial image depicting the verifying user 104 taken by the camera 200 of the user electronic computing device 102 forming part of the biometric user data ensures that, even in the event that an unauthorized party obtains physical possession, custody, or control of the user electronic computing device 102, the unauthorized party is unable to decrypt the encrypted single user identity data file unless and until they achieve a biometric identity match. Due to the inherently unique nature and quality of the biometric user data and the secondary biometric user data, only the verifying user 104 can succeed in achieving a biometric identity match. In this way, the personal data and information of the verifying user 104 is kept reliably secure and all identity matches are authentic and accurate such that a requesting user need not question the legitimacy or reliability of an identity match.

In one embodiment, the method 100 further comprises the Step of communicating the electronic identity verification request to the user electronic computing device 102 using a Short Message Service ("SMS") text or another comparable electronic notification capability, e.g., e-mail, push notifications, etc. Communication of the electronic identity verification request to the user electronic computing device 102 serves to timely notify the verifying user 104 of an outstanding electronic identity verification request and to prompt the verifying user 104 to initiate the next Steps required to achieve an identity match, as detailed above.

In an exemplary embodiment of the present invention, the method 100 further comprises storing the at least one of the secondary biometric user data of the verifying user 104, the secondary personalized user data, the secondary unique phone data from the user electronic computing device 102, the at least one of the biometric user data of the verifying user 104 from the user electronic computing device 102, the personalized user data from the user electronic computing device 102, and the unique phone data from the user electronic computing device 102 used in the closed-network identity verification session 1200 on at least one of the first administrator server 106 and the second administrator server 108 on a data block forming part of an interconnected plurality of data blocks linked together and each also having a cryptographic hash of a previously generated block and a timestamp, also generally referred to as a blockchain among those skilled in the art. Specifically, a blockchain is a growing list of records, called blocks, that are linked together using cryptography. Each block contains a cryptographic hash of the previous block, a timestamp, and transaction data (generally represented as a Merkle tree). The timestamp proves that the transaction data existed when the block was published in order to get into its hash. Blocks contain the hash of the previous block, forming a chain, with each additional block reinforcing the one before it. Therefore, blockchains are resistant to modification of their data because once recorded, the data in any given block cannot be altered retroactively without altering all subsequent blocks. In view of the foregoing, this feature of the method 100 provides added security and protection over the data of the verifying user 104, e.g., the secondary biometric user data of the verifying user 104, the secondary personalized user data, the secondary unique phone data from the user electronic computing device 102, the biometric user data of the verifying user 104 from the user electronic computing device 102, the personalized user data from the user electronic computing device 102, the unique phone data from the user electronic computing device 102, etc., such that the data of the verifying user 104 is resistant to unauthorized attempts to access or decrypt the data such as, for example and without limitation, by hackers.

In an alternate embodiment, the method 100 also comprises segregating the single user identity data file into the plurality of encrypted segregated user identity data files each of randomly generated data sizes. Segregating the plurality of encrypted segregated user identity data files into randomly generated data sizes makes it more difficult for unauthorized third parties to garner a cognizable or fruitful portion of the complete single user identity data file even if they obtain one of the plurality of encrypted segregated user identity data files.

In accordance with a further feature of one embodiment of the present invention, the method 100 further comprises the Step of communicating, from the requestor electronic computing device 110 communicatively coupled to the user electronic computing device 102, the electronic identity verification request to the user electronic computing device 102. This feature beneficially conserves time for the requesting user 112 as the electronic identity verification request is communicated directly from the requestor electronic computing device 110 to user electronic computing device 102. In alternate embodiments, the electronic identity verification request may be communicated from the servers 106, 108 to enable greater administrative oversight or control.

In an alternate embodiment of the present invention, the method 100 may be utilized in connection with verifying the authenticity and ownership of a specific asset rather than a specific user, wherein the asset may be either tangible or intangible, e.g., vehicle, house, stocks, etc. To protect and prove the authenticity of an asset, the current owner registers the serial number that is uniquely associated with the asset and, after supplying electronically certificated proof of ownership, the asset is issued its own unique Digital Secured Unforgeable Serial Number ("DSUsn"). The DSUsn may then be linked directly to the owner's DSUid, supplying proof of ownership and traceability of the asset. In accordance with this embodiment, the method 100 further comprises receiving, at the first administrator server 106 that is communicatively coupled to the user electronic computing device 102 over a network, asset data of the verifying user 104 from the user electronic computing device 102; compiling the asset data into a single asset identity data file, associating the single asset identity data file with the verifying user 104, encrypting the single asset identity data file and generating a data decryption key, and segregating the single asset identity data file into a plurality of encrypted segregated asset identity data files each independently stored on the first administrator server 106 and the second administrator server 108; and communicating the data decryption key to the user electronic computing device 102 for storage on the memory 206 thereon. A next Step comprises communicating an electronic identity verification request to the user electronic computing device 102, the electronic identity verification request forming a closed-network identity verification session 1200 that includes: executing the identity verification software application on the user electronic computing device 102; communicatively coupling the user electronic computing device 102, the first administrator server 106, and the second administrator server 108 over the network; communicating, from the user electronic computing device 102, at least one of secondary biometric user data of the verifying user 104, secondary personalized user data, and secondary unique phone data from the user electronic computing device 102 to at least one of the first administrator server 106 and the second administrator server 108; communicating the data decryption key from the user electronic computing device to at least one of the first administrator server 106 and the second administrator server 108; aggregating the plurality of encrypted segregated asset identity data files stored on the first administrator server 106 and the second administrator server 108 to generate and decrypt, utilizing the data decryption key, the single asset identity data file; autonomously verifying an identity of the verifying user 104 by comparing the at least one of the secondary biometric user data of the verifying user 104, the secondary personalized user data, and the secondary unique phone data from the user electronic computing device 102 to at least one of the biometric user data of the verifying user 104 from the user electronic computing device 102, the personalized user data from the user electronic computing device 102, and the unique phone data from the user electronic computing device 102 to ascertain a data and identity match; and communicating an indication of the asset data and user identity match to the requestor electronic computing device 110.

In an exemplary embodiment, the method 100 further comprises the closed-network identity verification session 1200 including, after the data and identity match, recompiling the single user identity data file, encrypting the single user identity data file and generating a secondary data decryption key, and segregating the single user identity data file into a plurality of secondary encrypted segregated user identity data files each independently stored on the first administrator server 106 and the second administrator server 108; and communicating the secondary data decryption key to the user electronic computing device 102 for storage on the memory 206 thereon. In accordance with blockchain capabilities, each single user identity data file that is subsequently compiled or generated is protected in the same manner as the original single user identity data file.

In the scope of a commercial transaction, when a company requires to confirm the identity of a customer, or when they require a document or agreement to be signed, they must communicate an electronic identity verification request to the user electronic computing device 102 by inputting their customer details including their customer's mobile phone number and email address, etc., or importing the customer details from their CRM package. For online/website usage, the method 100 can supply the company with an API with predefined buttons/links to integrate to their signup process.

To continue with each step of the method 100, the previous step must be completed correctly and accepted. If not, the verifying user 104 is invited to try again or request technical support. The method 100 may further comprise a witness feature for double certification as required by certain contracts. If the contract or document is too complicated or lengthy to be signed on a smartphone, the verifying user 104 can use a computer once the geolocation of the smartphone and the IP location of the computer are verified to ensure the two match.

The artificial intelligence capabilities of the method 100 conduct numerous automated checks to ensure documents are real and authentic, including correct signatures, positioning of all form details and specific information such as, without limitation, telephone numbers, first and last names, a scan of an ID document previously provided. To guard against unauthorized attempts to access a verifying user's 104 data, the number of successful authentications (SA) completed versus unsuccessful authentications (UA) completed will impact the scoring by a maximum of 25%, which is formulated as follows. Since the first successful Identification, if UA>1 then UA/SA=FSA (first successful authentication %). For the last 12 months, if UA>1 then UA/SA=YSA (Year successful authentication %). For the last 3 months, if UA>1 then UA/SA=QSA (Quarter successful authentication %). The calculation is the average impact on the DSUId score: 100−(Sum (OSA+YSA+QSA)/3) =NAF. If NAF<25%, DSUId is reduced by NAF %. If NAF>25%, DSUId is reduced by 25%. All information about DSUId usage attempts is stored and analyzed, including all picture, fingerprint, and voice inputs. In the case of unsuccessful authentication, all the biometrics fraudulently used are recorded including the geolocation, date and time are recorded along with the phone IMEI and language of the phone, or OS, serial number and language for a PC using a phone simulator. With the strength of this database, the AI feature will compare any unsuccessful attempts with its history and take action if necessary.

The action could be locking the account, informing the company via email of possible fraudulent activity, and/or requesting the user telephone technical support. This database enables the method 100 to anticipate fraudulent activity by looking historically at the data collected on unsuccessful authentications such as location of user, type of device used or type of document supplied etc.

Figure 4:
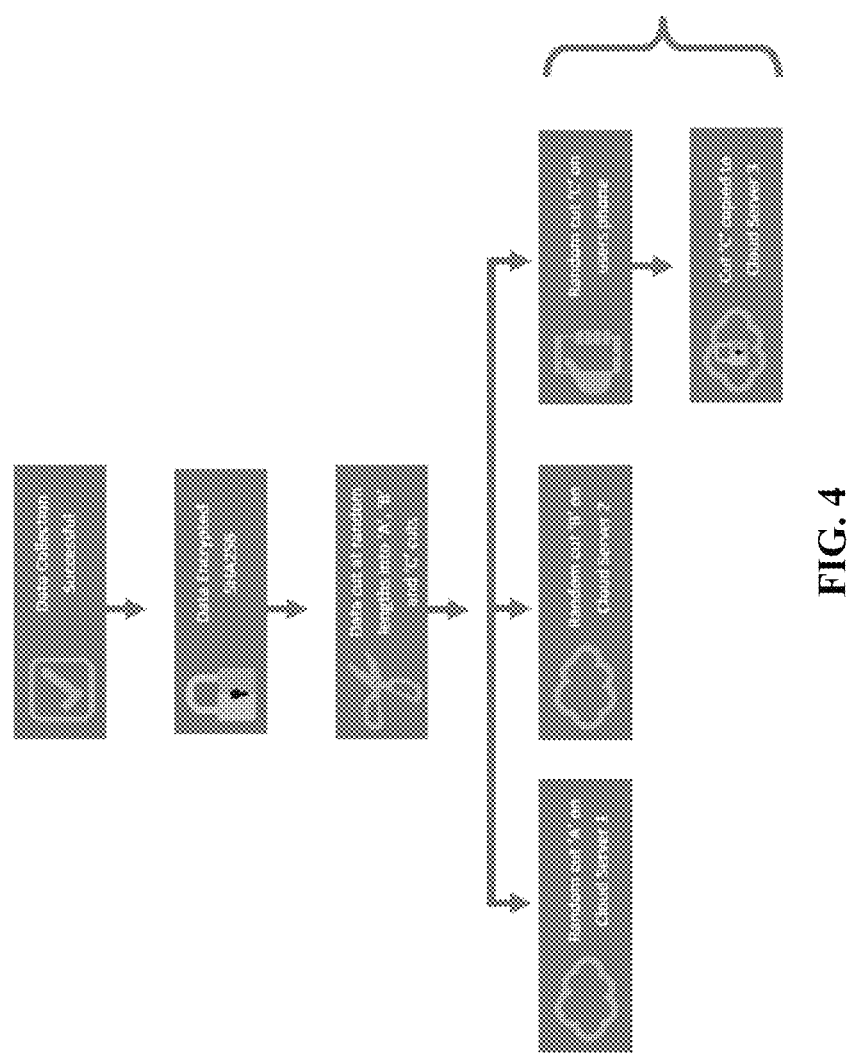
FIG. 4 is a schematic diagram depicting several exemplary steps of the computer-implemented user identity verification method.

All the data collected on a user is combined and encrypted into one single DSUId, i.e., the single user identity data file. As best depicted in the flowchart diagram of FIG. 4, the single user identity data file is then randomly split into two and then sealed using blockchain technology with full hashing (SHA-256). The AI decides where to randomly split the data between the first portion referred to as the 'A cut' which is then securely stored on the first administrator server 106 and the second portion referred to as the 'B cut' stored on the second administrator server 108. In addition, a random 'cut C' is stored in a third location which, in a preferred embodiment, is the user electronic computing device 102 of the verifying user 104, with this portion also being backed-up to a third administrator server. 'Cut C' is always stored on the user electronic computing device 102, but a copy of this is also secured on the third administrator server which would only be collated back from the administrator server 106, 108 with 'Cut A' and 'Cut B' if (i) the verifying user 104 changes or loses the user electronic computing device 102, reinstalls the executable identity verification software application, and passes the new identity verification process; or (ii) a court of law order requests disclosure of the full details of a verifying user 104. If the verifying user 104 in the future wants to change part of their DSUId, another facial image or voice recording of the verifying user 104 must be provided to double-check and verify their identity. The method 100 may be found particularly useful by any company requiring legally binding signatures on any contract, including, but not limited to any B2B contracts; banking; lawyers/solicitors; housing associations; utilities suppliers; insurance suppliers/agents; phone providers; internet providers; or any user dealing with contractual agreements.

What is claimed is:

1. A computer-implemented user identity verification method comprising:

providing a user electronic computing device of a verifying user with an electronic display, a memory, a camera, and an executable identity verification software application resident the memory thereon;

providing a requestor electronic computing device of a requesting user;

providing a first administrator server and a second administrator server;

receiving, at the first administrator server that is communicatively coupled to the user electronic computing device over a network, biometric user data of the verifying user from the user electronic computing device, personalized user data from the user electronic computing device, and unique phone data from the user electronic computing device;

compiling the biometric user data, the personalized user data, and the unique phone data into a single user identity data file, encrypting the single user identity data file and generating a data decryption key, and segregating the single user identity data file into a plurality of encrypted segregated user identity data files each independently stored on the first administrator server and the second administrator server;

communicating the data decryption key to the user electronic computing device for storage on the memory thereon; and communicating an electronic identity verification request to the user electronic computing device, the electronic identity verification request forming a closed-network identity verification session that includes:

executing the identity verification software application on the user electronic computing device;

communicatively coupling the user electronic computing device, the first administrator server, and the second administrator server over the network;

communicating, from the user electronic computing device, at least one of secondary biometric user data of the verifying user, secondary personalized user data, and secondary unique phone data from the user electronic computing device to at least one of the first administrator server and the second administrator server;

communicating the data decryption key from the user electronic computing device to at least one of the first administrator server and the second administrator server;

aggregating the plurality of encrypted segregated user identity data files stored on the first administrator server and the second administrator server to generate and decrypt, utilizing the data decryption key, the single user identity data file;

autonomously verifying an identity of the verifying user by comparing the at least one of the secondary biometric user data of the verifying user, the secondary personalized user data, and the secondary unique phone data from the user electronic computing device to at least one of the biometric user data of the verifying user from the user electronic computing device, the personalized user data from the user electronic computing device, and the unique phone data from the user electronic computing device to ascertain a data and identity match; and communicating an indication of the data and identity match to the requestor electronic computing device.

2. The computer-implemented user identity verification method according to claim 1, wherein the biometric user data of the verifying user received from the user electronic computing device includes a digital facial image depicting the verifying user taken by the camera of the user electronic computing device, the closed-network identity verification session further comprising:

taking a picture of the verifying user from the camera of the user electronic computing device, the picture of the verifying user from the camera of the user electronic computer device forming part of the secondary biometric user data of the verifying user and communicating the at least one of a secondary biometric user data of the verifying user to the at least one of the first administrator server and the second administrator server; and autonomously verifying an identity of the verifying user by comparing the picture of the verifying user from the camera of the user electronic computer device forming part of the secondary biometric user data of the verifying user to the digital facial image depicting the verifying user taken by the camera of the user electronic computing device to ascertain the data and identity match.

3. The computer-implemented user identity verification method according to claim 2, further comprising:

communicating the electronic identity verification request to the user electronic computing device using a SMS text.

4. The computer-implemented user identity verification method according to claim 2, further comprising:

storing the at least one of the secondary biometric user data of the verifying user, the secondary personalized user data, the secondary unique phone data from the user electronic computing device, the at least one of the biometric user data of the verifying user from the user electronic computing device, the personalized user data from the user electronic computing device, and the unique phone data from the user electronic computing device used in the closed-network identity verification session on at least one of the first administrator server and the second administrator server on a data block forming part of an interconnected plurality of data blocks linked together and each also having a cryptographic hash of a previously generated block and a timestamp.

5. The computer-implemented user identity verification method according to claim 2, wherein the user electronic computing device and the requestor electronic computing device are located in geographically remote and independent locations with respect to the first administrator server and the second administrator server.

6. The computer-implemented user identity verification method according to claim 2, further comprising:

segregating the single user identity data file into the plurality of encrypted segregated user identity data files each of randomly generated data sizes.

7. The computer-implemented user identity verification method according to claim 2, further comprising:

communicating, from the requestor electronic computing device communicatively coupled to the user electronic computing device, the electronic identity verification request to the user electronic computing device.

8. The computer-implemented user identity verification method according to claim 2, wherein the closed-network identity verification session further comprises:

communicatively coupling the user electronic computing device, the first administrator server, the second administrator server, and the requestor electronic computing device together on the network.

9. The computer-implemented user identity verification method according to claim 2, further comprising:

providing the first administrator server, the second administrator server, and a third administrator server, wherein the data decryption key is backed-up on the third administrator server.

10. The computer-implemented user identity verification method according to claim 2, wherein:

the biometric user data including the digital facial image depicting the verifying user taken from a physical indicia of identification depicting a facial image depicting the verifying user, the physical indicia of identification including at least one of a government issued license and a government issued passport.

11. The computer-implemented user identity verification method according to claim 10, further comprising:

a digital geolocation associated with metadata from the facial image of the verifying user taken by the camera of the electronic computing device, a physical card image depicting a facial image of the verifying user, and a digital phone verification from the electronic computing device sent by the first server.

12. The computer-implemented user identity verification method according to claim 2, further comprising:

receiving, at the first administrator server that is communicatively coupled to the user electronic computing device over a network, asset data of the verifying user from the user electronic computing device;

compiling the asset data into a single asset identity data file, associating the single asset identity data file with the verifying user, encrypting the single asset identity data file and generating a data decryption key, and segregating the single asset identity data file into a plurality of encrypted segregated asset identity data files each independently stored on the first administrator server and the second administrator server;

communicating the data decryption key to the user electronic computing device for storage on the memory thereon;

communicating an electronic identity verification request to the user electronic computing device, the electronic identity verification request forming a closed-network identity verification session that includes:

executing the identity verification software application on the user electronic computing device;

communicatively coupling the user electronic computing device, the first administrator server, and the second administrator server over the network;

communicating, from the user electronic computing device, at least one of secondary biometric user data of the verifying user, secondary personalized user data, and secondary unique phone data from the user electronic computing device to at least one of the first administrator server and the second administrator server;

communicating the data decryption key from the user electronic computing device to at least one of the first administrator server and the second administrator server;

aggregating the plurality of encrypted segregated asset identity data files stored on the first administrator server and the second administrator server to generate and decrypt, utilizing the data decryption key, the single asset identity data file;

autonomously verifying an identity of the verifying user by comparing the at least one of the secondary biometric user data of the verifying user, the secondary personalized user data, and the secondary unique phone data from the user electronic computing device to at least one of the biometric user data of the verifying user from the user electronic computing device, the personalized user data from the user electronic computing device, and the unique phone data from the user electronic computing device to ascertain a data and identity match; and communicating an indication of the asset data and user identity match to the requestor electronic computing device.

13. The computer-implemented user identity verification method according to claim 2, further comprising:

the closed-network identity verification session including, after the data and identity match, recompiling the single user identity data file, encrypting the single user identity data file and generating a secondary data decryption key, and segregating the single user identity data file into a plurality of secondary encrypted segregated user identity data files each independently stored on the first administrator server and the second administrator server; and communicating the secondary data decryption key to the user electronic computing device for storage on the memory thereon.

14. A computer-implemented user identity verification method comprising:

providing a user electronic computing device of a verifying user with an electronic display, a memory, a camera, and an executable identity verification software application resident the memory thereon;

providing a requestor electronic computing device of a requesting user;

providing a first administrator server and a second administrator server;

receiving, at the first administrator server that is communicatively coupled to the user electronic computing device over a network, biometric user data of the verifying user from the user electronic computing device;

compiling the biometric user data into a single user identity data file, encrypting the single user identity data file and generating a data decryption key, and segregating the single user identity data file into a plurality of encrypted segregated user identity data files each independently stored on the first administrator server and the second administrator server;

communicating the data decryption key to the user electronic computing device for storage on the memory thereon; and communicating an electronic identity verification request to the user electronic computing device, the electronic identity verification request forming a closed-network identity verification session that includes:

executing the identity verification software application on the user electronic computing device;

communicatively coupling the user electronic computing device, the first administrator server, and the second administrator server over the network;

communicating, from the user electronic computing device, secondary biometric user data of the verifying user from the user electronic computing device to at least one of the first administrator server and the second administrator server;

communicating the data decryption key from the user electronic computing device to at least one of the first administrator server and the second administrator server;

aggregating the plurality of encrypted segregated user identity data files stored on the first administrator server and the second administrator server to generate and decrypt, utilizing the data decryption key, the single user identity data file;

autonomously verifying an identity of the verifying user by comparing the secondary biometric user data of the verifying user from the user electronic computing device to the biometric user data of the verifying user from the user electronic computing device, to ascertain a data and identity match; and communicating an indication of the data and identity match to the requestor electronic computing device.

\* \* \* \* \*